US012496836B2

(12) United States Patent
Tanaka

(10) Patent No.: US 12,496,836 B2
(45) Date of Patent: Dec. 16, 2025

(54) EXPOSURE-CONTROLLING APPARATUS AND IMAGE-FORMING APPARATUS

(71) Applicant: CANON KABUSHIKI KAISHA, Tokyo (JP)

(72) Inventor: Yasutomo Tanaka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 159 days.

(21) Appl. No.: 18/501,885

(22) Filed: Nov. 3, 2023

(65) Prior Publication Data

US 2024/0152070 A1 May 9, 2024

(30) Foreign Application Priority Data

Nov. 4, 2022 (JP) ................................ 2022-177362

(51) Int. Cl.

*B41J 2/45* (2006.01)
*B41J 2/47* (2006.01)
*G03G 15/043* (2006.01)

(52) U.S. Cl.

CPC . *B41J 2/45* (2013.01); *B41J 2/47* (2013.01); *G03G 15/043* (2013.01); *G03G 2215/0409* (2013.01)

(58) Field of Classification Search

CPC ..... B41J 2/435; B41J 2/447; B41J 2/45; B41J 2/47; G03G 15/04; G03G 14/043; G03G 2215/0407; G03G 2215/0409

See application file for complete search history.

(56) References Cited

U.S. PATENT DOCUMENTS

2020/0225600 A1* 7/2020 Seki ...................... G03G 21/20

FOREIGN PATENT DOCUMENTS

JP 2006-305763 A 11/2006
JP 2017-183436 A 10/2017

* cited by examiner

*Primary Examiner* — Douglas X Rodriguez
*Assistant Examiner* — Kendrick X Liu
(74) *Attorney, Agent, or Firm* — Canon U.S.A., Inc. IP Division

(57) ABSTRACT

There is provided an apparatus having an exposure head including K light-emitting chips arranged along a rotation axis of a photosensitive body. Light-emitting elements to form a latent image are arranged in each light-emitting chip. The apparatus includes: a dividing unit that divides image data into K pieces of partial image data for the K light-emitting chips that are temporarily stored in memory resources; and a control unit that controls output of the K pieces of partial image data from the memory resources to the K light-emitting chips. The control unit controls allocation of the memory resources to the K light-emitting chips based on information indicating which ones of odd-numbered and even-numbered light-emitting chips of the K light-emitting chips are arranged on downstream side with respect to the photosensitive body which rotates.

16 Claims, 18 Drawing Sheets

EXPOSURE-CONTROLLING APPARATUS AND IMAGE-FORMING APPARATUS

BACKGROUND

Technical Field

The aspect of the embodiments relates to an exposure-controlling apparatus and an image-forming apparatus.

Description of the Related Art

A generally known type of electro-photographic image-forming apparatus includes a solid-state exposure apparatus that forms a latent image by exposing a photosensitive drum with light emitted by an LED (for example, an organic EL element) rather than a laser beam. An exposure head of this type of apparatus includes a light-emitting element set including a plurality of light-emitting elements arranged parallel to a rotation axis of the photosensitive drum and a rod lens array for focusing the light from the light-emitting element set on the surface of the photosensitive drum. Compared to a laser scanning image-forming apparatus, a solid-state exposure image-forming apparatus has an advantage in that the size and the cost of the apparatus can be easily reduced.

Japanese Patent Laid-Open No. 2017-183436 discloses a configuration of an exposure head of a solid-state exposure image-forming apparatus in which a plurality of light-emitting chips each including a plurality of LEDs are arranged in a staggered manner along a direction parallel to a rotation axis of a photosensitive drum. This configuration with the plurality of light-emitting chips arranged in a staggered manner is advantageous as the size of the exposure head can be easily changed. Japanese Patent Laid-Open No. 2006-305763 discloses a technique of compensating for effects of a deviation in implementation of chips arranged in a staggered manner in a recording head by adaptively controlling a timing of printing operation for each chip though the technique is directed not at a solid-state type apparatus but at an inkjet type apparatus.

In a case where one line of an image is formed by a plurality of chips arranged in a staggered manner as in the case of Japanese Patent Laid-Open No. 2006-305763, it is required to output, to the chips, respective pieces of partial image data corresponding to the chips at different timings instead of outputting them all at the same time. In general, such timing control is based on using memory to buffer the image data and delay data output. At this time, if the minimum amount of memory that can handle the delay amount required for each light-emitting chip is implemented in an apparatus, the manufacturing cost of the apparatus can be minimized. However, such implementation would impose constraints on where the light-emitting chips can be arranged in the exposure head, making it difficult to flexibly change the design. On the other hand, by associating a large-capacity memory with all of the light-emitting chips, flexibility in terms of how to arrange the light-emitting chips in the exposure head is ensured, but the manufacturing cost of the apparatus is significantly increased.

SUMMARY

An apparatus for controlling exposure of a photosensitive body with light by an exposure head is provided. The exposure head includes K (K is an integer equal to or larger than two) light-emitting chips that are arranged in a staggered manner along a first direction that is parallel to a rotation axis of the photosensitive body. Each of the K light-emitting chips includes at least a plurality of light-emitting elements arranged along the first direction. The plurality of light-emitting elements of the K light-emitting chips emit light whereby a latent image for each line of an input image is formed on a surface of the photosensitive body. The apparatus includes: a dividing unit configured to divide image data of each line of the input image into K pieces of partial image data that are respectively output to the K light-emitting chips; a first storage unit that is a set of memory resources for temporarily storing the K pieces of partial image data; and a control unit configured to control output of the K pieces of partial image data from the first storage unit to the K light-emitting chips. The control unit is configured to control allocation of the memory resources to the K light-emitting chips based on first information indicating which ones of odd-numbered light-emitting chips and even-numbered light-emitting chips out of the K light-emitting chips are arranged on downstream side with respect to the photosensitive body which rotates.

Further features of the disclosure will become apparent from the following description of exemplary embodiments (with reference to the attached drawings).

DESCRIPTION OF THE EMBODIMENTS

Figure 1:
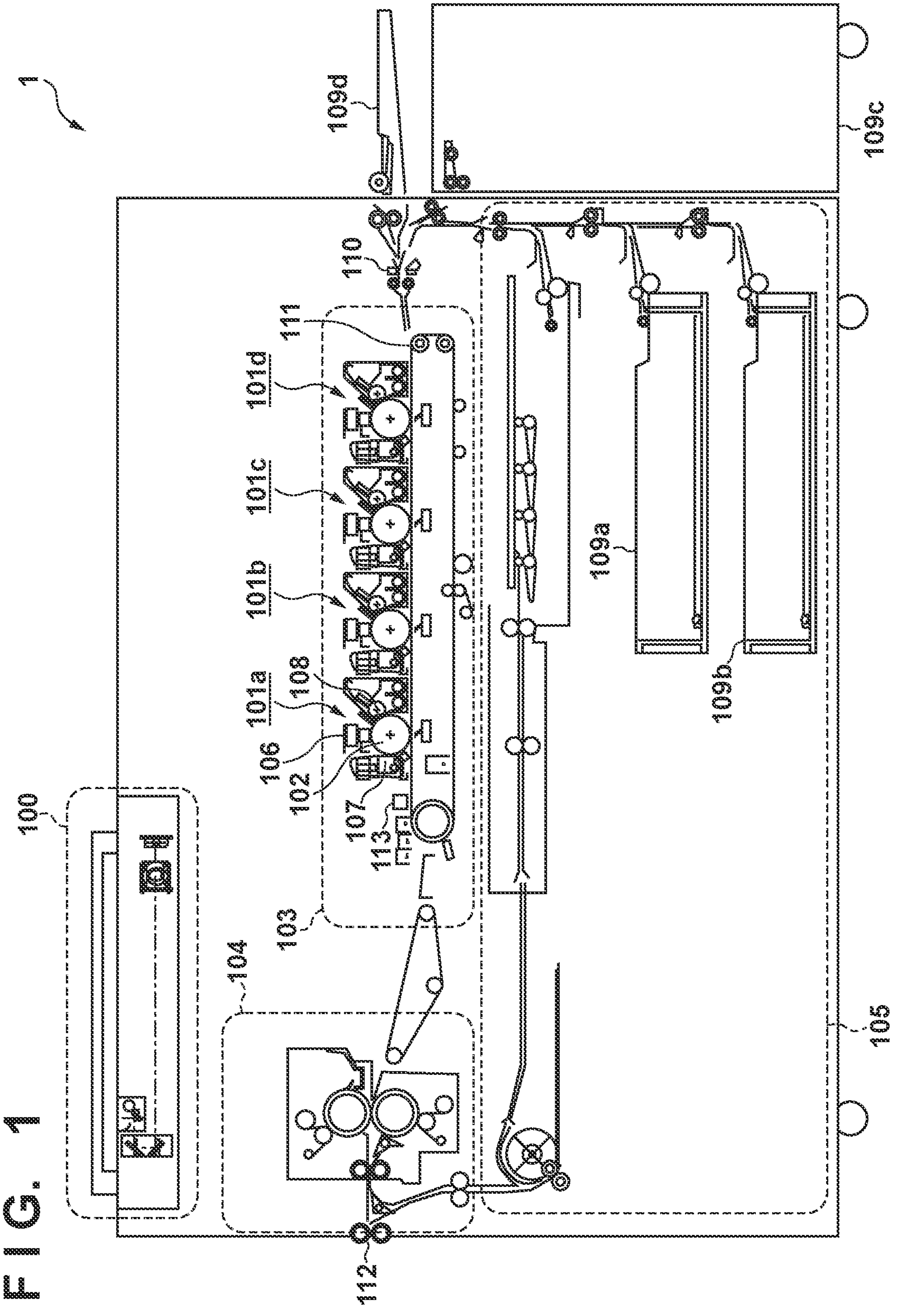
FIG. 1 is a configuration diagram illustrating a schematic configuration of an image-forming apparatus according to an embodiment.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

1. SCHEMATIC CONFIGURATION OF IMAGE-FORMING APPARATUS

FIG. 1 is a diagram illustrating an example of a schematic configuration of an image-forming apparatus 1 according to an embodiment. The image-forming apparatus 1 includes a reading unit 100, a forming unit 103, a fixing unit 104, and a conveying unit 105. The reading unit 100 optically reads a document placed on a platen and generates read image data. The image-forming unit 103, for example, forms an image on a sheet based on the read image data generated by the reading unit 100 or based on image data for printing received from an external apparatus via a network.

The forming unit 103 includes image-forming units 101*a*, 101*b*, 101*c*, and 101*d*. The image-forming units 101*a*, 101*b*, 101*c*, and 101*d* respectively form a black, yellow, magenta, and cyan toner image. The configurations of the image-forming units 101*a*, 101*b*, 101*c*, and 101*d* are the same, and hereinafter they are collectively referred to as image-forming units 101. A photosensitive body 102 of the image-forming unit 101 is rotationally driven in the clockwise direction of the diagram when image-forming is performed. A charging device 107 charges the photosensitive body 102. An exposure head 106 exposes the photosensitive body 102 with light in accordance with the image data to form an electrostatic latent image on the surface of the photosensitive body 102. A developing device 108 develops the electrostatic latent image on the surface of the photosensitive body 102 using toner to form a toner image. The toner image formed on the surface of the photosensitive body 102 is transferred to a sheet conveyed on a transfer belt 111. By transferring the toner images of the four photosensitive bodies 102 to the sheet on top of one another, a color image including the four color components black, yellow, magenta, and cyan can be formed.

The conveying unit 105 controls the feeding and conveying of sheets. Specifically, the conveying unit 105 feeds a sheet to the conveyance path of the image-forming apparatus 1 from the unit specified from among internal storage units 109*a* and 109*b*, an external storage unit 109*c*, and a manual insertion unit 109*d*. The fed sheet is conveyed to a registration roller 110. The registration roller 110 conveys the sheet onto the transfer belt 111 at the appropriate timing so that the toner images of the photosensitive bodies 102 are transferred to the sheet. As described above, the toner images are transferred to the sheet while the sheet is being conveyed on the transfer belt 111. The fixing unit 104 applies heat and pressure to the sheet with the toner images transferred to fix the toner images to the sheet. After the toner images are fixed, the sheet is discharged to the outside of the image-forming apparatus 1 by a discharge roller 112. An optical sensor 113 is disposed at a position facing the transfer belt 111. The optical sensor 113 is used to detect misalignment (color misalignment) between the color components on a test image formed on the transfer belt 111 by the image-forming unit 101. In a case where color misalignment is detected, under the control of an image controller 800 described below, the image-forming positions of the image-forming units 101*a*, 101*b*, 101*c*, and 101*d* are corrected to compensate for the detected color misalignment.

Note that in the example described above, the toner images are directly transferred from the photosensitive bodies 102 to the sheet on the transfer belt 111. However, the toner images may be indirectly transferred from the photosensitive bodies 102 to the sheet via an intermediate transfer member. Though an example in which a color image is formed using a plurality of colors has been described here, the technology according to the present disclosure is also applicable to an image-forming apparatus that forms a monochrome image using a toner of a single color.

2. CONFIGURATION OF EXPOSURE HEAD

Figure 2A:
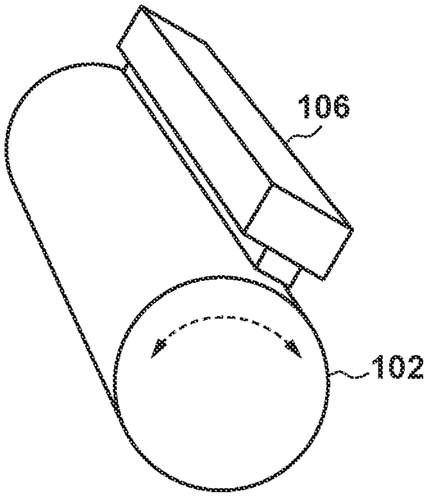
FIG. 2A is a first explanatory diagram for a configuration of a photosensitive body and an exposure head according to an embodiment.
Figure 2B:
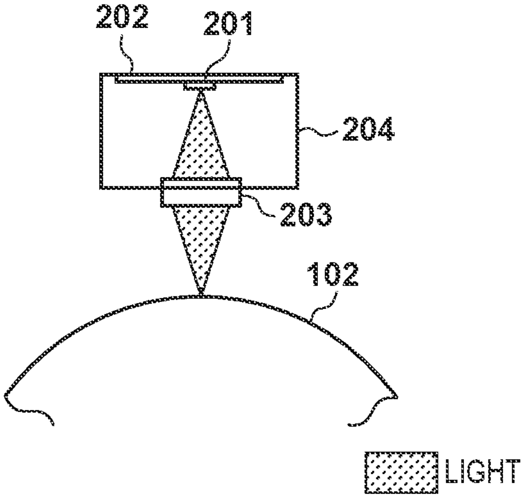
FIG. 2B is a second explanatory diagram for a configuration of the photosensitive body and the exposure head according to the embodiment.

FIGS. 2A and 2B are diagrams illustrating the photosensitive body 102 and the exposure head 106. The exposure head 106 includes a light-emitting element set 201, a printed substrate 202 on which the light-emitting element set 201 is implemented, a rod lens array 203, and a housing 204 that supports the printed substrate 202 and the rod lens array 203. The photosensitive body 102 has a cylindrical shape. The exposure head 106 is disposed with its longitudinal direction parallel to the rotation axis of the photosensitive body 102 and the surface where the rod lens array 203 is attached facing the surface of the photosensitive body 102. While the photosensitive body 102 rotates in the circumferential direction (indicated by a dashed line arrow in the diagram) about the rotation axis, the light-emitting element set 201 of the exposure head 106 emits light, and the rod lens array 203 focuses the light on the surface of the photosensitive body 102.

Figure 3A:
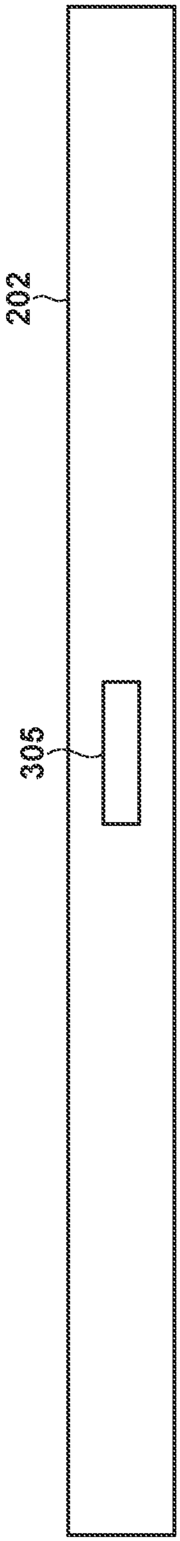
FIG. 3A is a first explanatory diagram for a configuration of a printed substrate of the exposure head of an embodiment.
Figure 3B:
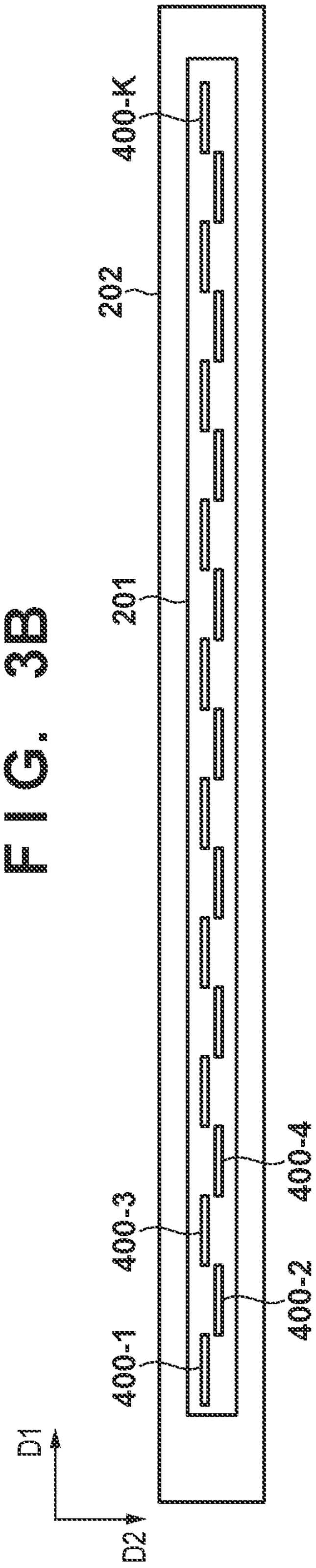
FIG. 3B is a second explanatory diagram for a configuration of the printed substrate of the exposure head of the embodiment.

FIGS. 3A and 3B are diagrams illustrating an example of the configuration of the printed substrate 202. Note that FIG. 3A illustrates the surface where a connector 305 is implemented, and FIG. 3B illustrates the surface where the light-emitting element set 201 is implemented (the surface on the opposite side to the surface where the connector 305 is implemented). In the present embodiment, the printed substrate 202 of the exposure head 106 includes K (K being an integer equal to or larger than two) light-emitting chips 400-1 to 400-K arranged in a staggered manner along a first direction D1. These light-emitting chips 400-1 to 400-K cover the maximum width (for example, approximately 313 mm) in the first direction D1 of an image to be formed. Note that in the present specification, when there is no need to discriminate between the light-emitting chips 400-1 to 400-K, the branch number on the back half of the reference number is omitted and a light-emitting chip 400 is used as a collective term. This also applies to branch numbers of the reference numbers of other components.

The first direction D1 is parallel to the rotation axis of the photosensitive body 102 and is orientated to correspond to the scan order in each line of image data described below. For the sake of convenience, the smaller branch numbers k (k=1, 2, . . . , K) of the light-emitting chips 400-*k* correspond to a position on the upstream side in the first direction D1. As illustrated in FIG. 3B, the light-emitting chips 400-*k* where k is an odd number (k=1, 3, . . . ) form one row, and the light-emitting chips 400-*k* where k is an even number (k=2, 4, . . . ) form another row, and the two rows have different positions in a second direction D2. Hereinafter, the light-emitting chips 400 in the former row may be referred to as odd-numbered light-emitting chips 400, and the light-emitting chips 400 in the latter row may be referred to as even-numbered light-emitting chips 400. The second direction D2 is orthogonal to the first direction D1 in the surface of the printed substrate 202 and is orientated to match the rotation direction of the opposing photosensitive body 102. In the example in FIG. 3B, the even-numbered light-emitting chips 400 are located on the downstream side in the second direction D2 with respect to the odd-numbered light-emitting chips 400.

Figure 4:
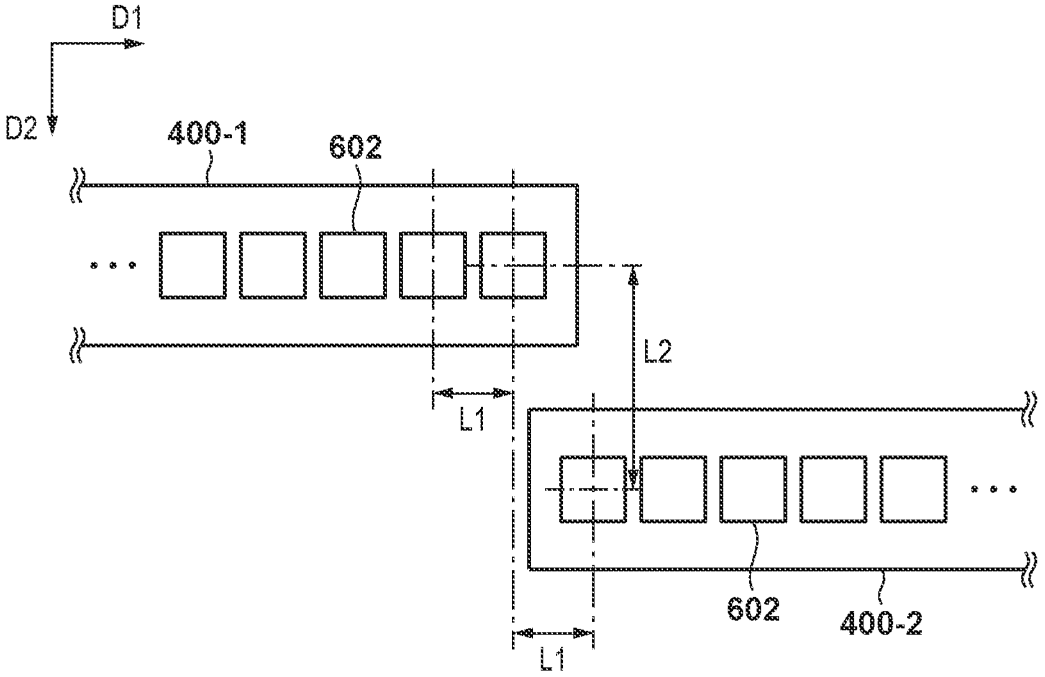
FIG. 4 is an explanatory diagram for the positional relationship among light-emitting elements in light-emitting chips according to an embodiment.

FIG. 4 is a diagram schematically illustrating the positional relationship among light-emitting elements 602 in light-emitting chips 400, focusing on two adjacent light-emitting chips 400-1 and 400-2. Each light-emitting chip 400 includes a plurality of light-emitting elements 602 arranged at least along the first direction D1. Though not illustrated in FIG. 4, the light-emitting element array in each light-emitting chip 400 may be a two-dimensional array including a plurality of light-emitting elements 602 arranged along the first direction D1 and the second direction D2. A pitch L1 of the light-emitting elements 602 adjacent in the first direction D1 is equal to approximately 21.16 μm (L1≈21.16 μm) supporting a resolution of 1200 dpi. The pitch L1 is maintained across the boundary between the two light-emitting chips 400-1 and 400-2. A gap L2 between the light-emitting chip 400-1 (odd-numbered light-emitting chip) and the light-emitting chip 400-2 (even-numbered light-emitting chip) in the second direction D2 may be approximately 846.4 μm (L2≈846.4 μm), for example. In this case, assuming a resolution of 1200 dpi, L2 corresponds to the length of 40 pixels. Note that the values for the pitch L1 and the gap L2 described above are merely examples, and other values may be used.

Returning to FIG. 3A, each light-emitting chip 400 is connected to the image controller 800 (see FIG. 7) via the connector 305. Each light-emitting element 602 of the K light-emitting chips 400 of the printed substrate 202 are driven in accordance with a data signal input via the connector 305 as is further described below. The position of the connector 305 in the image-forming apparatus 1 may be designed taking into account the wiring situation and the ease of tasks including attachment and maintenance.

Note that at the boundary between the two adjacent light-emitting chips 400-1 and 400-2, one or more of the light-emitting elements 602 at one end of one of the chips and one or more of the light-emitting elements 602 at one end of the other chip may overlap in the first direction D1. By overlapping the light-emitting elements 602, it is possible to avoid a situation where a blank region is formed which has been insufficiently exposed by the light-emitting elements 602 at the boundary between chips due to implementation misalignment of the light-emitting chips in the first direction D1 or thermal expansion of the substrate. One of the two overlapping light-emitting elements 602 may be controlled to not emit light as necessary.

Figure 5:
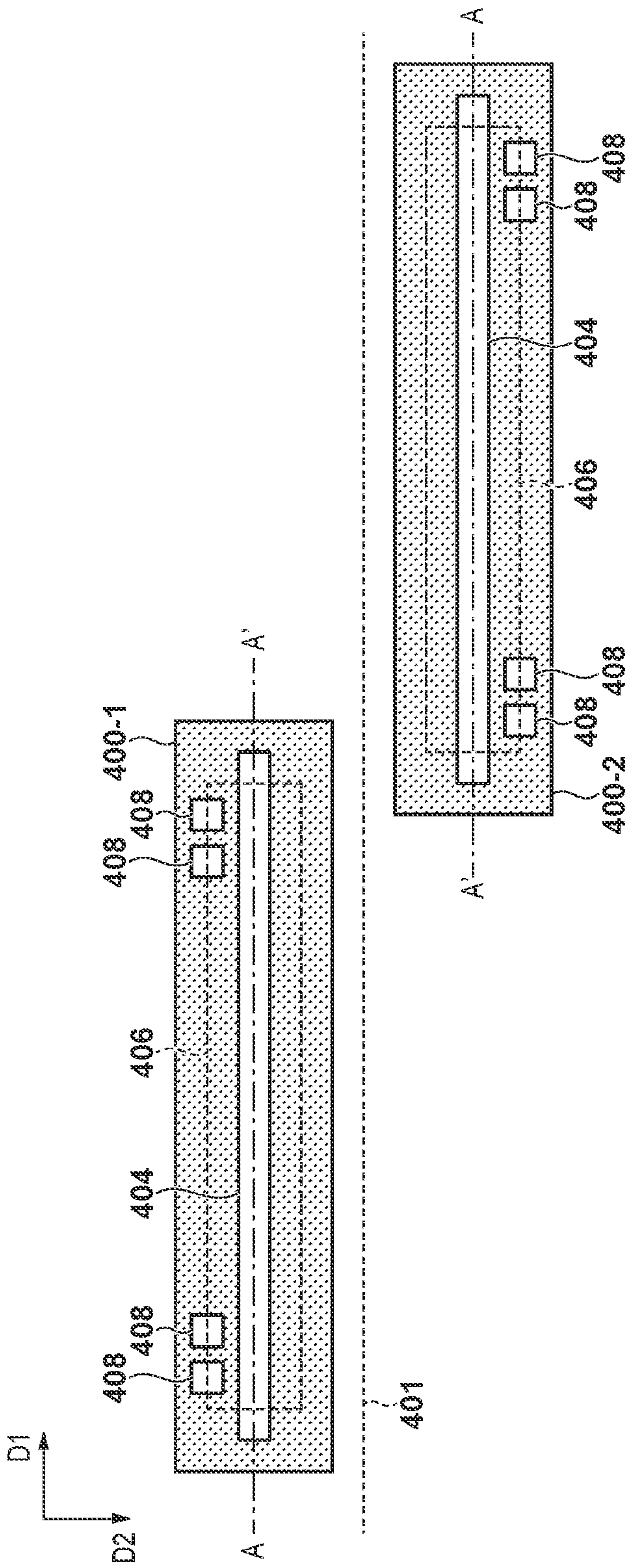
FIG. 5 is a plan view illustrating a schematic configuration of the light-emitting chips according to an embodiment.

FIG. 5 is a diagram schematically illustrating the configuration of light-emitting chips 400, focusing again on two adjacent light-emitting chips 400-1 and 400-2. A light-emitting element array 404 of each light-emitting chip 400 is formed on a light-emitting substrate that is a silicon substrate, for example. Also, the light-emitting substrate is provided with a circuit unit 406 for driving the plurality of light-emitting elements 602 and a plurality of pads 408. The plurality of pads 408 are used for connecting a signal line for communicating with the image controller 800, a power supply line for connecting to a power supply, and a ground line for connecting to a ground to the circuit unit 406. The signal line, the power supply line, and the ground line are wires made of gold, for example. The circuit unit 406 may include both an analog drive circuit and a digital control circuit.

In the example in FIG. 5, the pads 408 of light-emitting chip 400-1 are located on the upstream side in the second direction D2 with respect to the circuit unit 406, while the pads 408 of the light-emitting chip 400-2 are located on the downstream side in the second direction D2 with respect to the circuit unit 406. In other words, the positional relationship between the pads 408 and the circuit unit 406 are inverted in the two adjacent light-emitting chips 400. In this manner, providing the pads 408 at a position far from a center line 401 extending in the first direction D1 between the two rows of light-emitting chips 400 makes a good situation for wiring on the printed substrate 202. Alternatively, the positional relationship between the pads 408 and the circuit unit 406 may not be inverted in the two adjacent light-emitting chips 400.

Figure 6:
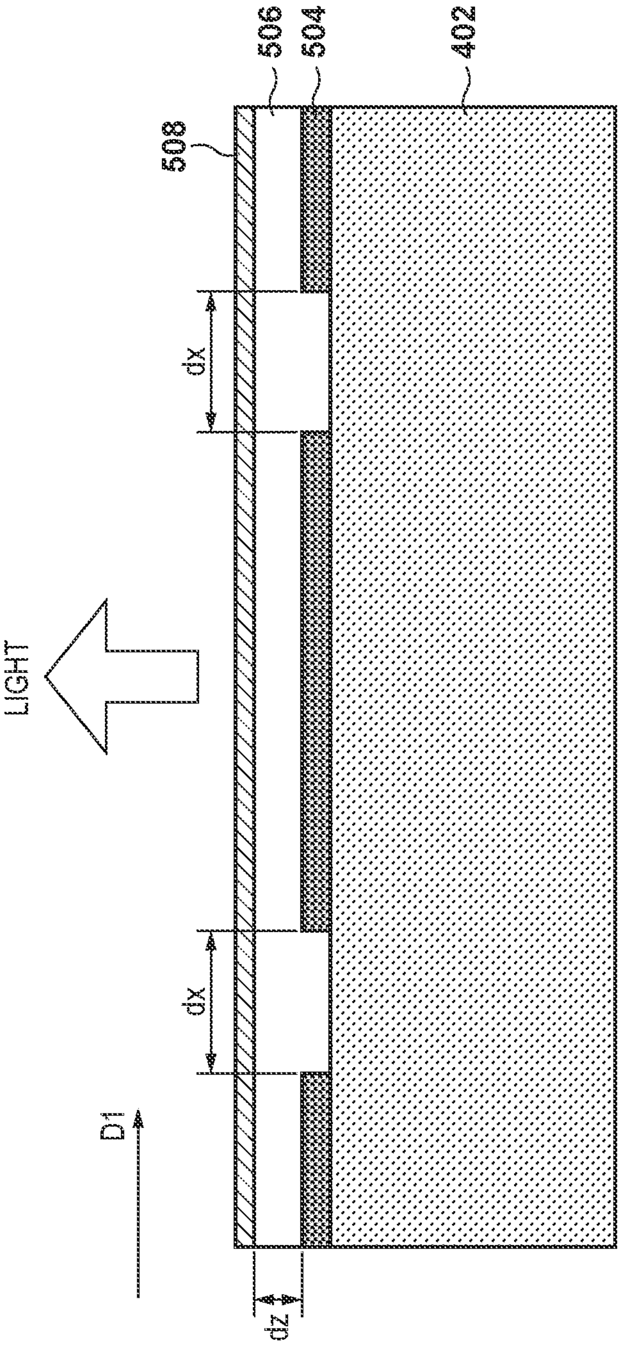
FIG. 6 is a cross-sectional view illustrating a schematic configuration of the light-emitting element according to an embodiment.

FIG. 6 is a diagram illustrating a part of a cross section taken along line A-A' in FIG. 5. A plurality of lower electrodes 504 are formed on a light-emitting substrate 402. A light-emitting layer 506 is provided on the lower electrodes 504, and an upper electrode 508 is provided on the light-emitting layer 506. The upper electrode 508 is one common electrode for the plurality of lower electrodes 504. When a voltage is applied between the lower electrodes 504 and the upper electrode 508, a current runs from the lower electrodes 504 to the upper electrode 508, causing the light-emitting layer 506 to emit light. Accordingly, one lower electrode 504 and partial regions of the light-emitting layer 506 and the upper electrode 508 corresponding to the lower electrode 504 form one light-emitting element 602. In the diagram, dx corresponds to the gap between two adjacent lower electrodes 504. dz corresponds to the gap between the lower electrode 504 and the upper electrode 508. By making dx larger than dz, leak current between the adjacent lower electrodes 504 can be suppressed, and light emission by light-emitting elements 602 not meant to emit light can be prevented.

In the present embodiment, each light-emitting element 602 may be constituted as an organic Electro-Luminescence (EL) element. For example, an organic EL film can be used for the light-emitting layer 506. In other embodiments, by using an inorganic EL film for the light-emitting layer 506, each light-emitting element 602 may be constituted as an inorganic EL element. Each light-emitting element 602 may be any type of Light-Emitting Diode (LED).

The upper electrode 508 is constituted by a transparent electrode made of indium tin oxide (ITO) or the like to be light-transmitting for the light emission wavelength of the light-emitting layer 506. In the example in FIG. 6, the entire upper electrode 508 is light-transmitting for the light emission wavelength of the light-emitting layer 506, but the entire upper electrode 508 does not need to be light-transmitting for the light emission wavelength. Specifically, it is sufficient that the partial regions where lights from respective light-emitting elements 602 pass through are light-transmitting.

Note that in FIG. 6, one continuous light-emitting layer 506 is formed. However, a plurality of the light-emitting layers 506 each with the same width as the width of the lower electrodes 504 may be formed on the lower electrodes 504. Also, in FIG. 6, the upper electrode 508 is formed as one common electrode for the plurality of lower electrodes 504. However, a plurality of the upper electrodes 508 each with the same width as the width of the lower electrodes 504 may be formed corresponding to the lower electrodes 504. Also, a first plurality of lower electrodes 504 from among the lower electrodes 504 of each light-emitting chip 400 may be covered by a first light-emitting layer 506, and a second plurality of lower electrodes 504 may be covered by a second light-emitting layer 506. In a similar manner, a first upper electrode 508 may be formed in common for a first plurality of lower electrodes 504 from among the lower electrodes 504 of each light-emitting chip 400, and a second upper electrode 508 may be formed in common for a second plurality of lower electrodes 504. Still in such configurations, one lower electrode 504 and regions of the light-emitting layer 506 and the upper electrode 508 corresponding to the lower electrode 504 form one light-emitting element 602.

3. CONFIGURATION OF IMAGE CONTROLLER

Figure 7:
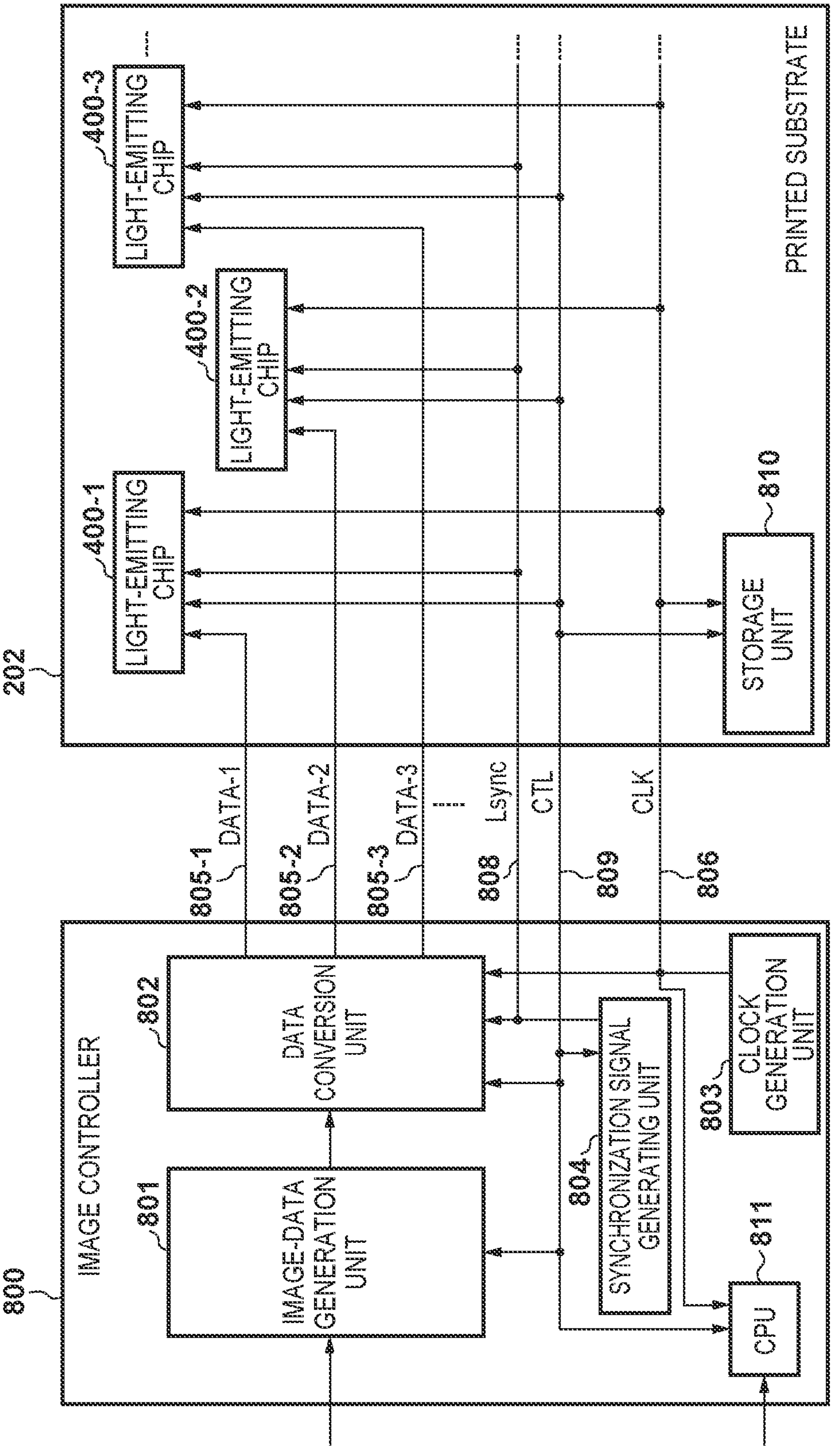
FIG. 7 is a block diagram illustrating a configuration of a control circuit relating to exposure control according to an embodiment.

FIG. 7 is a diagram illustrating an example of the configuration of a control circuit relating to exposure control. Note that in this example, for the sake of simplicity, the processing about a single color component will be described. However, in practice, the processing is executed in parallel for four color components.

The image controller 800 illustrated on the left in FIG. 7 is an exposure control apparatus for controlling the exposure of the photosensitive body 102 by the exposure head 106. The image controller 800 is connected to each light-emitting chip 400 on the printed substrate 202 via a plurality of signal lines 805 to 809. The data signal lines 805-*k* (k=1, 2, 3, . . . ) are connected to the light-emitting chips 400-*k*, respectively, and convey image data DATA-k. A clock signal line 806 conveys a clock signal CLK. A synchronizing signal line 808 conveys a line synchronizing signal Lsync for identifying line periods of the image data. A communication signal line 809 conveys a control signal CTL.

An image data generation unit 801 executes image processing on the image data received from the reading unit 100 or an external apparatus and generates image data in binary bitmap format for controlling the on/off of light emission of the light-emitting elements 602 of the light-emitting chips 400 on the printed substrate 202. The image processing here may include raster conversion and halftone processing (for example, dithering), for example. The image data after halftone processing is a set of bits indicating, for each of pixel positions constituting the image to be formed, whether or not to cause the corresponding light-emitting element 602 to emit light. In a case where a bit at a certain pixel position indicates "light emission", the corresponding spot region on the surface of the photosensitive body 102 is exposed to light by the corresponding light-emitting element 602. In a case where a bit indicates "no light emission", the corresponding spot region is not exposed to light. The image data generation unit 801 outputs the generated image data to a data conversion unit 802.

The data conversion unit 802 converts the image data of each line input from the image data generation unit 801 into K pieces of partial image data DATA-k at each line period identified by the line synchronizing signal Lsync. Then, the data conversion unit 802 sends the K pieces of partial image data DATA-k to the data signal lines 805-*k*. The configuration of the data conversion unit 802 will be described in more detail below.

A clock generation unit 803 generates the clock signal CLK and sends the clock signal CLK to the clock signal line 806 for synchronization of timings for transmitting and receiving the signal values between the data conversion unit 802 and the K light-emitting chips 400. A synchronizing signal generation unit 804 determines break points of lines for the image data, generates the line synchronizing signal Lsync, and supplies the generated line synchronizing signal Lsync to the synchronizing signal line 808.

A storage unit 810 of the printed substrate 202 is a memory (for example, a non-volatile memory) for storing control information for controlling the light emission by the light-emitting chips 400. For example, the control information is written from an external apparatus to the storage unit 810 when the exposure head 106 is manufactured. The control information stored by the storage unit 810 may include setting values relating to the drive current amount supplied to the light-emitting chips 400 and the chip arrangement information described below, for example.

Each light-emitting chip 400 drives the light-emitting elements 602 in accordance with the image data input from the data conversion unit 802 at each line period identified by the line synchronizing signal Lsync. Specifically, each light-emitting chip 400-*k* receives partial image data DATA-k for its own chip via the data signal lines 805-*k*. Then, each light-emitting chip 400-*k* drives each light-emitting element 602 of the light-emitting element array in accordance with the pixel values included in the received partial image data DATA-k. Next, the light-emitting elements 602 of the K light-emitting chips 400 emit light in accordance with the image data, and an electrostatic latent image for each line of the input image is formed on the surface of the photosensitive body 102. Then, as the result of a continuous formation of the lines in the circumferential direction of the photosensitive body 102, a two-dimensional electrostatic latent image is created.

A CPU 811 controls the entire image-forming apparatus 1. For example, the CPU 811 causes the image data generation unit 801 to generate the image data described above when a job for image-formation is executed and send the image data from the data conversion unit 802 to the printed substrate 202. The CPU 811, before executing the job, outputs the chip arrangement information read out from the storage unit (control information storage unit) 810 of the printed substrate 202 connected to the image controller 800 to the data conversion unit 802. The output of the image data from the data conversion unit 802 is controlled based on the chip arrangement information.

4. ENSURING FLEXIBILITY IN CHIP ARRANGEMENT

4.1 Chip Position

Figure 8A:
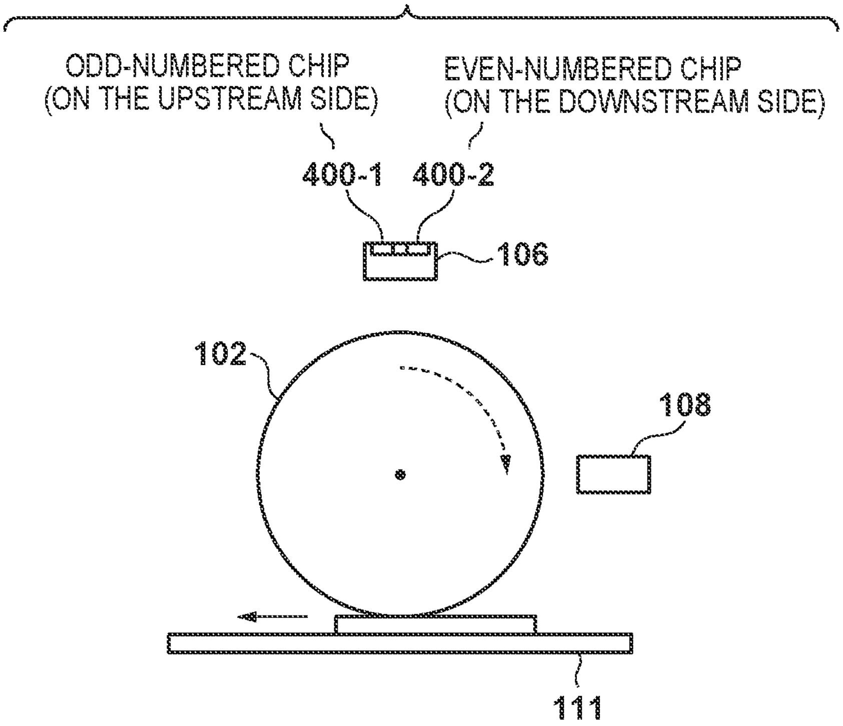
FIG. 8A is a first explanatory diagram for chip arrangement variation.
Figure 8B:
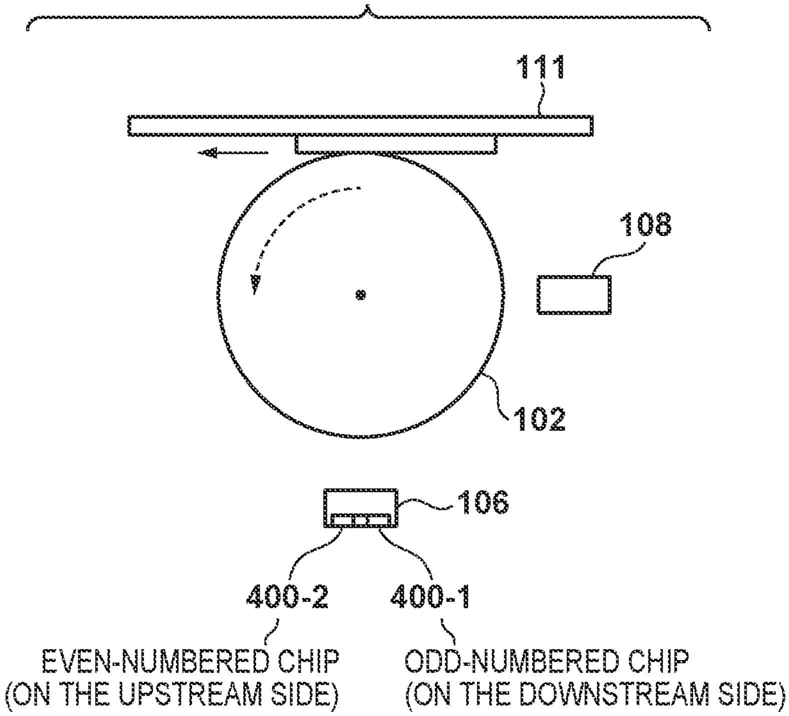
FIG. 8B is a second explanatory diagram for chip arrangement variation.

Manufacturers of an image-forming apparatus have been trying to supply the market with various types of products of different size and shape and with different circuit configurations to meet a diverse range of needs. To suppress an increase in the manufacturing cost of such products and realize product diversity, in one embodiment, the reusability of components between different types of products are increased. For example, as described using FIGS. 3A to 5, even-numbered light-emitting chips are located on the downstream side with respect to the odd-numbered light-emitting chips in a product of a certain type while the even-numbered light-emitting chips may be located on the upstream side with respect to the odd-numbered light-emitting chips in a product of a different type. FIGS. 8A and 8B are explanatory diagrams for describing such product variation.

In FIG. 8A, a positional relationship among the photosensitive body 102, the exposure head 106, the developing device 108, and the transfer belt 111 of the image-forming unit 101 similar to that illustrated in FIG. 1 is illustrated. The exposure head 106 is located above the photosensitive body 102 and emits light from up to down. The odd-numbered light-emitting chips 400 of the exposure head 106 are located on the left side of the diagram, and the even-numbered light-emitting chips 400 are located on the right side of the diagram. Since the photosensitive body 102 rotates in the clockwise direction in the diagram as indicated by the dashed line arrow, the odd-numbered light-emitting chips 400 of the exposure head 106 are located on the upstream side, and the even-numbered light-emitting chips 400 are located on the downstream side. In this manner, the chip arrangement of the even-numbered light-emitting chips 400 on the downstream side with respect to the rotation direction (the second direction D2) of the photosensitive body 102 may be referred to herein as the even-numbered-downstream arrangement.

In FIG. 8B, a positional relationship among the photosensitive body 102, the exposure head 106, the developing device 108, and the transfer belt 111 different to that illustrated in FIG. 8A is illustrated. The exposure head 106 is located below the photosensitive body 102 and emits light from down to up. The odd-numbered light-emitting chips 400 of the exposure head 106 are located on the right side of the diagram, and the even-numbered light-emitting chips 400 are located on the left side of the diagram. Since the photosensitive body 102 rotates in the anticlockwise direction in the diagram as indicated by the dashed line arrow, the odd-numbered light-emitting chips 400 of the exposure head 106 are located on the downstream side, and the even-numbered light-emitting chips 400 are located on the upstream side. In this manner, the chip arrangement of the odd-numbered light-emitting chips 400 on the downstream side with respect to the rotation direction of the photosensitive body 102 may be referred to herein as the odd-numbered-downstream arrangement.

As described using FIGS. 3A and 3B, whether to use the even-numbered-downstream arrangement or the odd-numbered-downstream arrangement for the image-forming apparatus may be decided in relation to the position of the connector 305 of the exposure head 106 and taking into account the wiring situation and the ease of tasks including attachment and maintenance. In such a situation, if an image controller 800 that is connectable to both an exposure head 106 using the even-numbered-downstream arrangement and an exposure head 106 using the odd-numbered-downstream arrangement is provided, the reusability of components is increased.

Here, the data conversion unit 802 of the image controller 800 divides the image data of each line of the input image into K pieces of partial image data and outputs the partial image data to the K light-emitting chips 400. At this time, the timing for outputting the pieces of partial image data of each line to the light-emitting chips 400 on the downstream side is to be delayed by an amount corresponding to the chip gap L2 with respect to the timing for outputting the pieces of partial image data of the same line to the light-emitting chips 400 on the upstream side. For example, by setting the pixel pitch in the second direction D2 to 21.16 μm and the chip gap L2 to 846.4 μm, L2 corresponds to 40 lines. In this case, a memory resource for buffering at least 40 lines of partial image data for a light-emitting chip 400 on the downstream side is required for each of the number of light-emitting chips 400 on the downstream side. However, if the image controller 800 is made able to support both the even-numbered-downstream arrangement and the odd-numbered-downstream arrangement, any of the light-emitting chips 400 has eventually a possibility to be located on the downstream side. Thus, with a uniform allocation of memory resources, the memory resources for 40 lines for all of the light-emitting chips 400 is to be prepared. This means an increase in the manufacturing cost of the image controller 800.

In the embodiment described below, to suppress an increase in the manufacturing costs without decreasing the flexibility in chip arrangement in the exposure head 106, in the data conversion unit 802 of the image controller 800, a mechanism is implemented for variably allocating memory resources. For example, the manufacturer of an apparatus writes first control information indicating whether the positional relationship between the photosensitive body 102 and the exposure head 106 used in the image-forming unit 101 is the even-numbered-downstream arrangement or the odd-numbered-downstream arrangement from an external apparatus to the control information storage unit 810. The first control information is, more specifically, information indicating whether, from among the K light-emitting chips, the odd-numbered light-emitting chips or the even-numbered light-emitting chips are arranged on the downstream side with respect to the rotating photosensitive body. Hereinafter, the first control information may be referred to as the chip position information. The data conversion unit 802, as described in detail below, controls the allocation of memory resources for the K light-emitting chips 400 based on the chip position information.

4-2. Chip Orientation

Figure 9A:
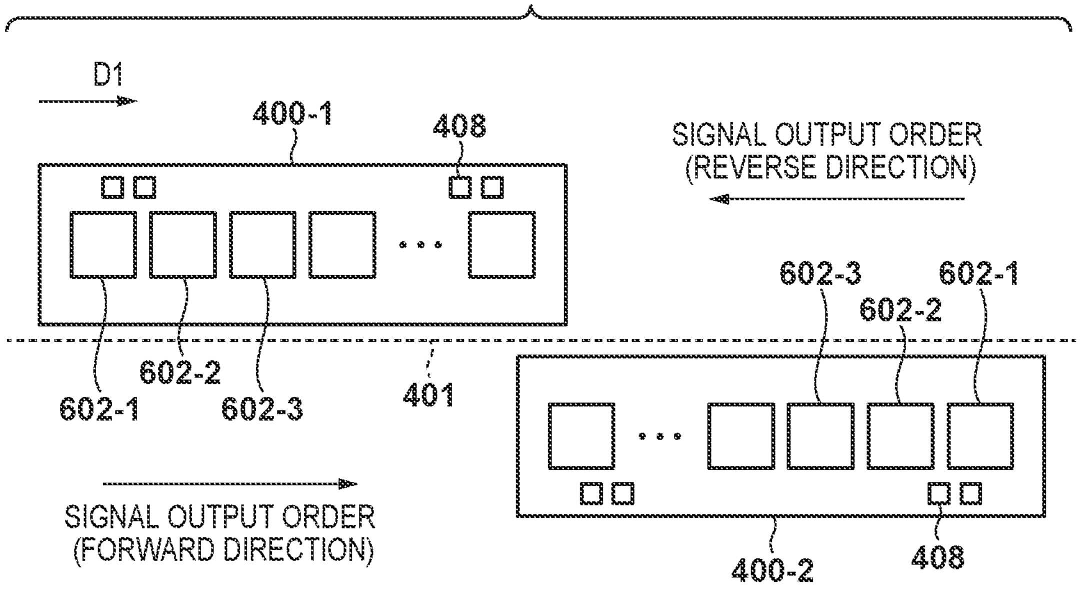
FIG. 9A is a first explanatory diagram for a variation relating to the order of outputting signals in light-emitting chips.
Figure 9B:
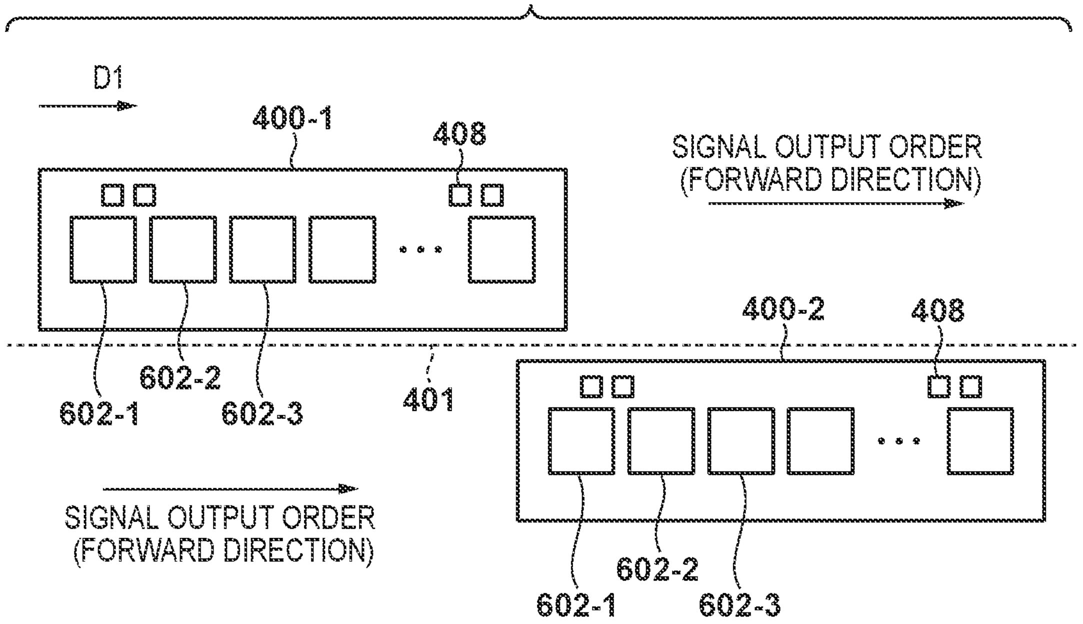
FIG. 9B is a second explanatory diagram for a variation relating to the order of outputting signals in light-emitting chips.

Furthermore, in a product of a certain type, as described using FIG. 5, the positional relationship between the pads 408 and the circuit unit 406 is inverted in two adjacent light-emitting chips 400. By inverting two light-emitting chips 400 with the same circuit design in this manner, the order of outputting signals to the plurality of light-emitting elements 602 in one of the light-emitting chips 400 becomes inverted with respect to the order of outputting signals in the other light-emitting chip 400. In this case, the order of outputting signals of one light-emitting chip 400 corresponds to the forward direction and the order of outputting signals of the other light-emitting chip 400 corresponds to the reverse direction with respect to the order of scanning pixel values of an input image. FIGS. 9A and 9B are explanatory diagrams for describing variation relating to the order of outputting signals among light-emitting chips.

The example in FIG. 9A corresponds to the positional relationship between the pads 408 and the circuit unit 406 described using FIG. 5. The first light-emitting chip 400-1 is illustrated on the left of the diagrams, and the second light-emitting chip 400-2 is illustrated on the right. Each light-emitting chip 400 includes the plurality of light-emitting elements 602-1, 602-2, 602-3, and so on. The branch number of the plurality of light-emitting elements 602 in the diagrams indicates the order of outputting signals to the light-emitting elements 602, and outputting a signal to a light-emitting element 602 with a lower branch number precedes outputting a signal to a light-emitting element 602 with a higher branch number. In the first light-emitting chip 400-1 illustrated in FIG. 9A, the light-emitting elements 602-1, 602-2, 602-3, and so on are arranged from the left along the first direction D1. Thus, the order of outputting signals to the light-emitting elements 602 is the forward direction with respect to the order of scanning of pixel values of image data. On the other hand, in the second light-emitting chip 400-2, the light-emitting elements 602-1, 602-2, 602-3, and so on are arranged from the right. Thus, the order of outputting signals to the light-emitting elements 602 is the reverse direction with respect to the order of scanning of pixel values of image data.

Moving to FIG. 9B, in both the first light-emitting chip 400-1 and the second light-emitting chip 400-2, the light-emitting elements 602-1, 602-2, 602-3, and so on are arranged from the left along the first direction D1. Thus, the order of outputting signals to the light-emitting elements 602 is the forward direction with respect to the order of scanning of pixel values of image data for both light-emitting chips 400.

In a comparison of the two examples, the example in FIG. 9B in which the order of outputting signals to the light-emitting elements 602 never becomes the reverse direction is advantageous in that the signal output control is simple. On the other hand, as described in relation to FIG. 5, the example in FIG. 9A has a good situation for wiring as the pads 408 come at a position distanced from the center line 401 in all of the light-emitting chips 400. Accordingly, whether to use the orientation with the forward direction or the reverse direction with respect to the order of outputting signals to the light-emitting elements 602 still depends on the design of the manufacturer of the apparatus. Note that in the example illustrated in FIG. 9A, from among the odd-numbered light-emitting chips and the even-numbered light-emitting chips, the signal output order of the former is the forward direction and the signal output order of the latter is the reverse direction. However, naturally a variation in which the signal output order of the former is the reverse direction and the signal output order of the latter is the forward direction can be conceived.

In the embodiment described below, to be able to use the image controller 800 no matter which orientation out of the forward direction and the reverse direction is used, a mechanism that can switch the order of reading out pixel values from the memory resources is introduced. For example, the manufacturer of an apparatus writes second control information for controlling the order of reading out pixel values from the memory resources from an external apparatus to the control information storage unit 810. The second control information is, more specifically, information indicating the orientation in which each of the K light-emitting chips 400 is implemented in the exposure head 106. Hereinafter, the second control information may be referred to as the chip orientation information. As described in detail below, the data conversion unit 802 controls the order of reading out pixel values constituting partial image data based on the chip orientation information when the corresponding partial image data is output to each light-emitting chip 400.

4-3. Configuration Example of Chip Arrangement Information

In the present specification, the chip position information (the first control information) and the chip orientation information (the second control information) described above may be collectively referred to as the chip arrangement information.

The chip position information may be 1-bit information indicating whether the odd-numbered light-emitting chips from among the K light-emitting chips are arranged on the upstream side or the downstream side. For example, the chip position information indicating "0" means that the odd-numbered light-emitting chips are arranged on the upstream side and the even-numbered light-emitting chips are arranged on the downstream side. The chip position information indicating "1" means that the odd-numbered light-emitting chips are arranged on the downstream side and the even-numbered light-emitting chips are arranged on the upstream side. Naturally, the bit values (0/1) and their meaning may be reversed.

The chip orientation information may be 1-bit information indicating whether the forward direction or the reverse direction is implemented in each of light-emitting chips. For example, the chip orientation information indicating "0" means that each of the odd-numbered light-emitting chips is implemented in the forward direction and each of the even-numbered light-emitting chips is implemented in the reverse direction. The chip orientation information indicating "1" means that each of the odd-numbered light-emitting chips is implemented in the reverse direction and each of the even-numbered light-emitting chips is implemented in the forward direction. Naturally, the bit values (0/1) and their meaning may be reversed. In this example, the state with all of the light-emitting chips 400 implemented in the forward direction as illustrated in FIG. 9B is not indicated by the chip orientation information. The chip arrangement information including the chip position information described above and this chip orientation information is information totaling 2 bits and covers four types of chip arrangement variations.

The chip orientation information may include 1 bit indicating whether the forward direction or the reverse direction is implemented in each of the odd-numbered light-emitting chips and 1 bit indicating whether the forward direction or the reverse direction is implemented in each of the even-numbered light-emitting chips. For example, the bit value "0" means that the related light-emitting chips 400 are implemented in the forward direction, and the bit value "1" means that the related light-emitting chips 400 are implemented in the reverse direction. In this example, the state with all of the light-emitting chips 400 implemented in the forward direction as illustrated in FIG. 9B can be indicated by the chip orientation information. The chip arrangement information combining the 1-bit chip position information with the 2-bit chip orientation information is information totaling 3 bits and covers eight types of chip arrangement variations.

Note that the configuration of the chip arrangement information is not limited to the examples described above. To cover a broader range of types of chip arrangement variations, the chip arrangement information may include more bits.

5. DETAILS OF DATA CONVERSION UNIT

The data conversion unit 802, for example, may be implemented using a dedicated processing circuit such as an application specific integrated circuit (ASIC) or a field programmable gate array (FPGA). Alternatively, the data conversion unit 802 may be implemented using a combination of a general-purpose processor and a memory. In the latter case, a computer program for implementing the functions of the data conversion unit 802 is stored in advance in a non-transitory computer-readable storage medium, loaded on random access memory (RAM), and executed by a processor.

(1) Circuit Example Configuration

Figure 10:
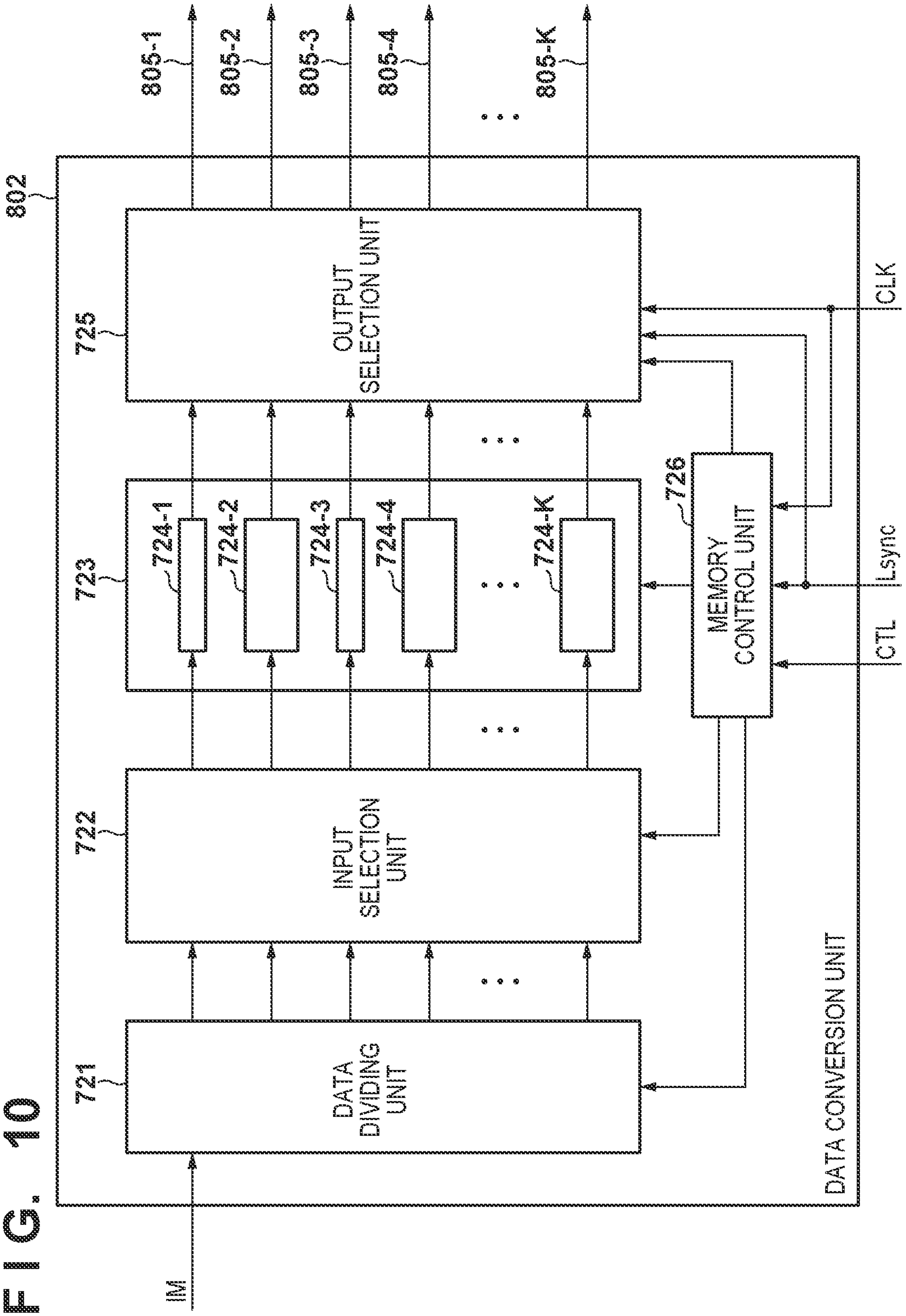
FIG. 10 is a block diagram illustrating a detailed configuration of a data conversion unit according to an embodiment.

FIG. 10 is a block diagram illustrating a detailed configuration of the data conversion unit 802 according to the present embodiment. As illustrated in FIG. 10, the data conversion unit 802 includes a data dividing unit 721, an input selection unit 722, a data storage unit 723, an output selection unit 725, and a memory control unit 726.

The data dividing unit 721 divides image data IM of each line of the input image into K pieces of partial image data to be output to the K light-emitting chips 400. Then, the data dividing unit 721 outputs the K pieces of partial image data to the input selection unit 722.

The data storage unit 723 is a set of memory resources for temporarily storing the K pieces of partial image data. For example, the memory resources may be constituted by static random access memory (SRAM). In the example in FIG. 10, the data storage unit 723 includes K line memories 724-1 to 724-K. The capacity of each line memory 724-*k* in a case where k is an odd number is less than the capacity of each line memory 724-*k* in a case where k is an even number. Note that the K line memories 724-1 to 724-K may be individual memories or may be different memory regions statically or dynamically allocated in a solitary memory.

The input selection unit 722 is a selector arranged between the data dividing unit 721 and the data storage unit 723. The input selection unit 722 switches writing paths of partial image data from the data dividing unit 721 to the line memories 724-1 to 724-K in accordance with memory resource allocation by the memory control unit 726.

The output selection unit 725 is a selector arranged between the data storage unit 723 and the K data signal lines 805-1 to 805-K. The output selection unit 725 switches output paths of partial image data from the line memories 724-1 to 724-K in accordance with memory resource allocation by the memory control unit 726.

(2) Variable Allocation of Memory Resources

The memory control unit 726 controls allocation of memory resources to the K light-emitting chips 400 and output of the partial image data from allocated memory resources to corresponding light-emitting chips 400. Specifically, first, the memory control unit 726 decides which of the line memories 724 of the data storage unit 723 to allocate to each light-emitting chip 400 based on the chip position information read out from the storage unit 810.

In a first example, the chip position information indicates that the odd-numbered light-emitting chips are arranged on the upstream side. In other words, the even-numbered-downstream arrangement is used. In this case, the memory control unit 726 allocates the odd-numbered line memories 724-*k* to the odd-numbered light-emitting chips 400-*k* (k=1, 3, and so on). Also, the memory control unit 726 allocates the even-numbered line memories 724-*k* to the even-numbered light-emitting chips 400-*k* (k=2, 4, and so on).

In a second example, the chip position information indicates that the even-numbered light-emitting chips are arranged on the upstream side. In other words, the odd-numbered-downstream arrangement is used. In this case, the memory control unit 726 allocates the even-numbered line memories 724-(*k*+1) to the odd-numbered light-emitting chips 400-*k* (k=1, 3, and so on). Also, the memory control unit 726 allocates the odd-numbered line memories 724-(*k*–1) to the even-numbered light-emitting chips 400-*k* (k=2, 4, and so on).

Here, the amount of memory resources allocated to each of the light-emitting chips 400 determined to be arranged on the upstream side is defined as a first amount $C_1$, and the amount of memory resources allocated to each of the light-emitting chips 400 determined to be arranged on the downstream side is defined as a second amount $C_2$. Then, in both the first example and the second example, the second amount $C_2$ is larger than the first amount $C_1$. In this manner, buffering can be performed for the partial image data for the light-emitting chips 400 on the downstream side using the data storage unit 723 over a longer interval.

The memory control unit 726 causes the partial image data for the light-emitting chips 400 on the upstream side to be output from the data storage unit 723 to the corresponding light-emitting chips 400 at a first point in time $t_1$. Thereafter, the memory control unit 726 causes the partial image data for the light-emitting chips 400 on the downstream side to be output from the data storage unit 723 to the corresponding light-emitting chips 400 at a second point in time $t_2$ later than the first point in time $t_1$.

The difference between the amount $C_1$ of memory resources allocated to the light-emitting chips 400 on the upstream side and the amount $C_2$ of memory resources allocated to the light-emitting chips 400 on the downstream side is based on the number of line periods that advance during an interval from the first point in time $t_1$ to the second point in time $t_2$. A duration $\Delta t$ of the interval described above from the first point in time $t_1$ to the second point in time $t_2$ is typically calculated as $\Delta t = L2/V$, based on the chip gap L2 along the rotation direction of the photosensitive body 102 and a peripheral speed V of the photosensitive body 102. In a case where $\Delta t$ is equal to a times of the line period, and the data amount of one unit of partial image data is defined as Z, $C_2 = C_1 + \alpha Z$ may hold. Accordingly, compared to the case of a method of uniformly allocating memory resources instead of variably allocating memory resources, with the present embodiment, an amount of memory resources equal to the product of $\alpha Z$ and the number of light-emitting chips on the upstream side can be saved.

Figure 11A:
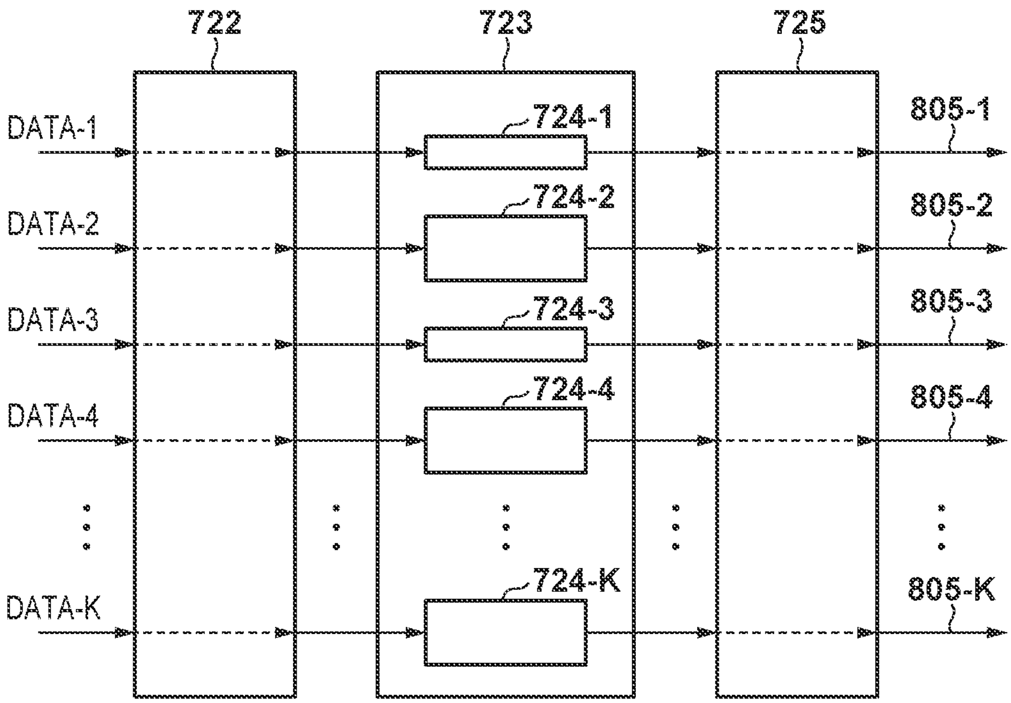
FIG. 11A is a first explanatory diagram for variable allocation of memory resources in the data conversion unit.
Figure 11B:
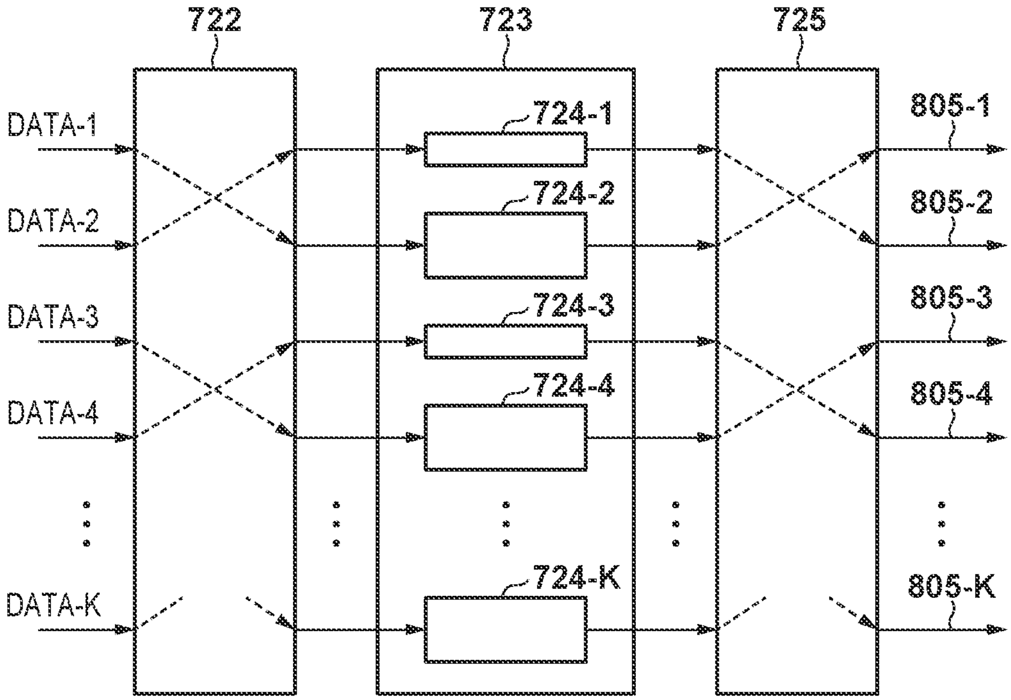
FIG. 11B is a second explanatory diagram for variable allocation of memory resources in the data conversion unit.

FIGS. 11A and 11B are explanatory diagrams for how memory resources are variably allocated in the data conversion unit 802. FIG. 11A corresponds to the first example described above, that is the even-numbered-downstream arrangement. In this case, the partial image data DATA-1, DATA-3, and so on for the odd-numbered light-emitting chips 400 are written to the odd-numbered line memories 724-1, 724-3, and so on via the input selection unit 722. The line memories 724-1, 724-3, and so on temporarily store the written data. Then, the partial image data DATA-1, DATA-3, and so on are promptly read out via the output selection unit

725 and sent to the corresponding data signal lines 805-1, 805-3, and so on. On the other hand, the partial image data DATA-2, DATA-4, and so on for the even-numbered light-emitting chips 400 are written to the even-numbered line memories 724-2, 724-4, and so on via the input selection unit 722. The line memories 724-2, 724-4, and so on temporarily store the written data. Then, the partial image data DATA-2, DATA-4, and so on are read out via the output selection unit 725 after a delay of the duration Δt and sent to the corresponding data signal lines 805-2, 805-4, and so on.

FIG. 11B corresponds to the second example described above, that is the odd-numbered-downstream arrangement. In this case, the partial image data DATA-1, DATA-3, and so on for the odd-numbered light-emitting chips 400 are written to the even-numbered line memories 724-2, 724-4, and so on via the input selection unit 722. The line memories 724-2, 724-4, and so on temporarily store the written data. On the other hand, the partial image data DATA-2, DATA-4, and so on for the even-numbered light-emitting chips 400 are written to the odd-numbered line memories 724-1, 724-3, and so on via the input selection unit 722. The line memories 724-1, 724-3, and so on temporarily store the written data. Then, the partial image data DATA-2, DATA-4, and so on are promptly read out via the output selection unit 725 and sent to the corresponding data signal lines 805-2, 805-4, and so on. The partial image data DATA-1, DATA-3, and so on are read out via the output selection unit 725 after a delay of the duration Δt and sent to the corresponding data signal lines 805-1, 805-3, and so on.

Figure 12A:
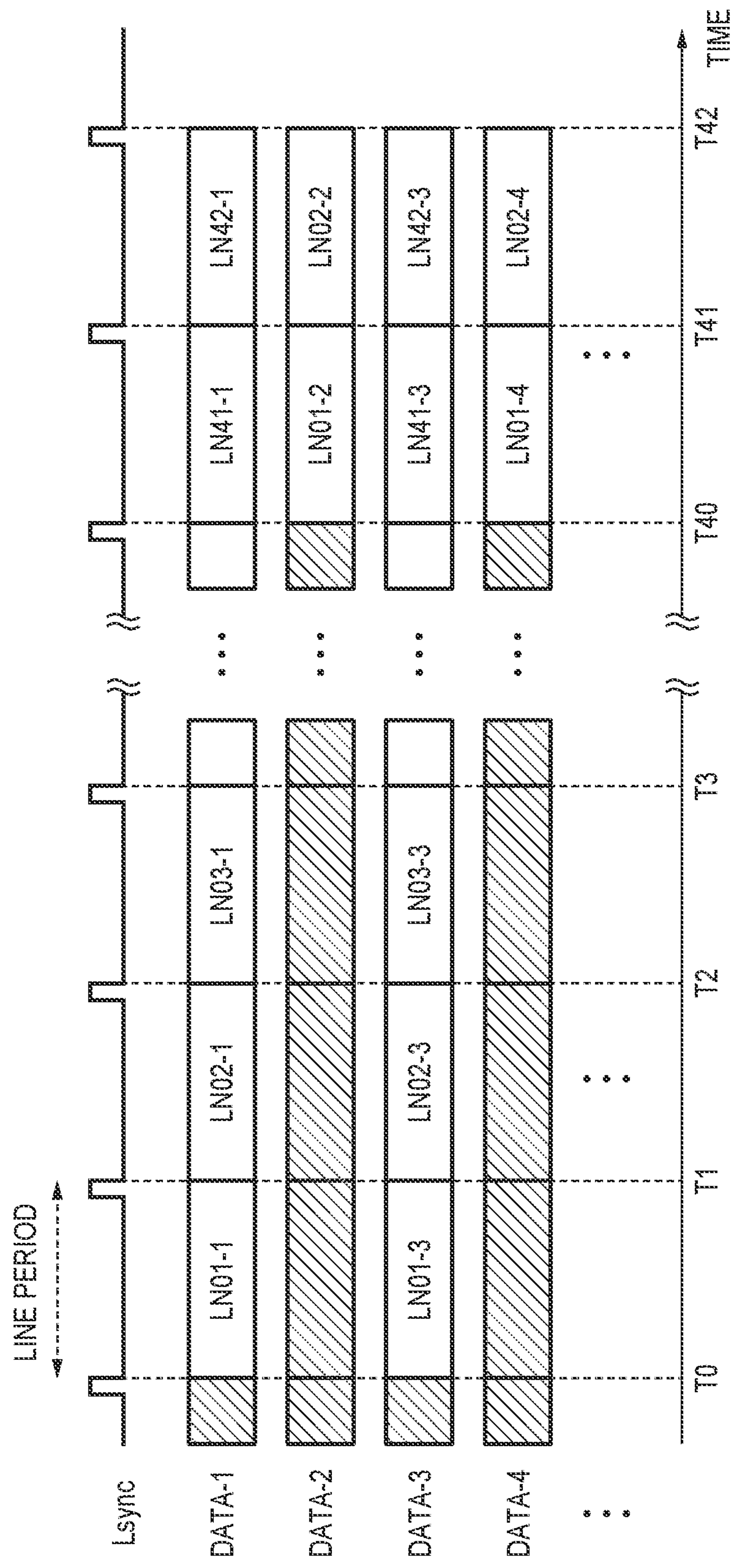
FIG. 12A is a timing chart illustrating an example of output timing for partial image data from the data conversion unit.

FIG. 12A is a timing chart illustrating a first example of output timing for the partial image data from the data conversion unit 802. The chip arrangement is the even-numbered-downstream arrangement. The horizontal axis in FIG. 12A represents the passage of time. The highest level in the diagram indicates the timing asserted by the line synchronizing signal Lsync, and the period of the assertion corresponds to the line period. The second to fifth levels represent the output timings of signal sequences LNxx-k of the partial image data DATA-k for the light-emitting chip 400-*k*, where k=1, 2, 3, and 4 and xx represents the line number.

First, in the line period from time T0 to T1, the signal sequence LN01-1 for the light-emitting chip 400-1 and the signal sequence LN01-3 for the light-emitting chip 400-3 of the first line are output. In the next line period from time T1 to T2, the signal sequence LN02-1 for the light-emitting chip 400-1 and the signal sequence LN02-3 for the light-emitting chip 400-3 of the second line are output. During this time, data is not output to the light-emitting chips 400-2 and 400-4 (and the other even-numbered light-emitting chips 400).

Figure 13A:
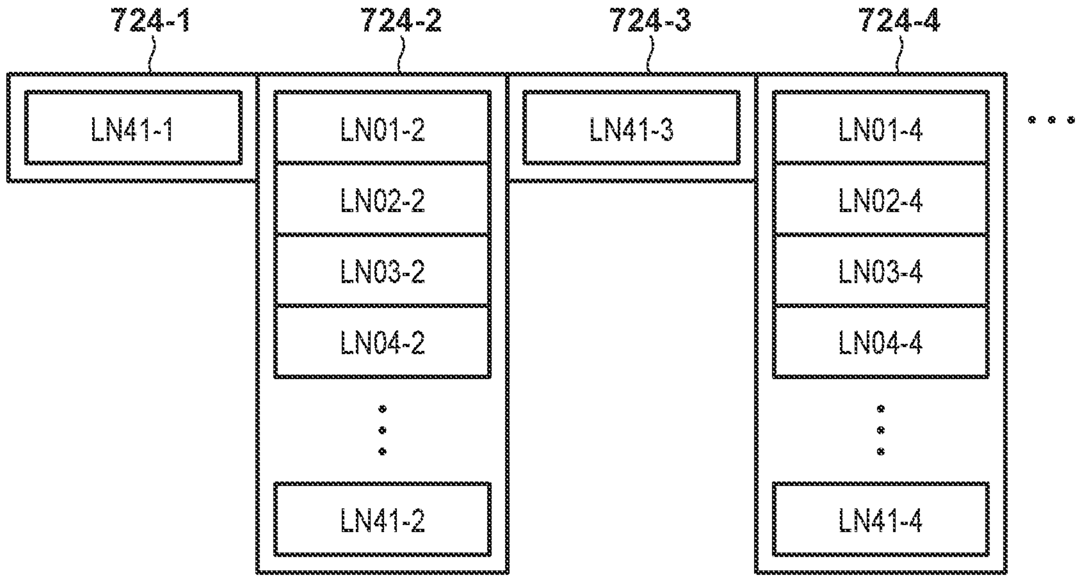
FIG. 13A is a first explanatory diagram illustrating how memory of the data conversion unit stores partial image data.

When time T40 is reached, the signal sequence for 40 lines has been output to the odd-numbered light-emitting chips 400-1, 400-3, and so on. The signal sequence LN41-1 for the light-emitting chip 400-1 of the next forty-first line is written to the line memory 724-1. The signal sequence LN41-3 for the light-emitting chip 400-3 of the next forty-first line is written to the line memory 724-3. However, partial image data has not been output to the even-numbered light-emitting chips 400-2, 400-4, and so on. The line memory 724-2 has the signal sequence for 40 lines for the light-emitting chip 400-2 stored therein, and in addition, the signal sequence LN41-2 of the forty-first line is written. The line memory 724-4 has the signal sequence for 40 lines for the light-emitting chip 400-4 stored therein, and in addition, the signal sequence LN41-4 of the forty-first line is written. FIG. 13A is a diagram illustrating how the data storage unit 723 stores the partial image data at this point in time. In each light-emitting chip 400, since necessary and sufficient amounts of memory resources for timing control of the data output have been allocated, the memory resources are efficiently used without waste as seen from the diagram.

Returning to FIG. 12A, in the line period from time T40 to T41, the signal sequence LN41-1 for the light-emitting chip 400-1 and the signal sequence LN41-3 for the light-emitting chip 400-3 of the forty-first line are output. Also, in the same line period, the signal sequence LN01-2 for the light-emitting chip 400-2 and the signal sequence LN01-4 for the light-emitting chip 400-4 of the first line are output. In the next line period from time T41 to T42, the signal sequence LN42-1 for the light-emitting chip 400-1 and the signal sequence LN42-3 for the light-emitting chip 400-3 of the forty-second line are output. Also, in the same line period, the signal sequence LN02-2 for the light-emitting chip 400-2 and the signal sequence LN02-4 for the light-emitting chip 400-4 of the second line are output.

Figure 12B:
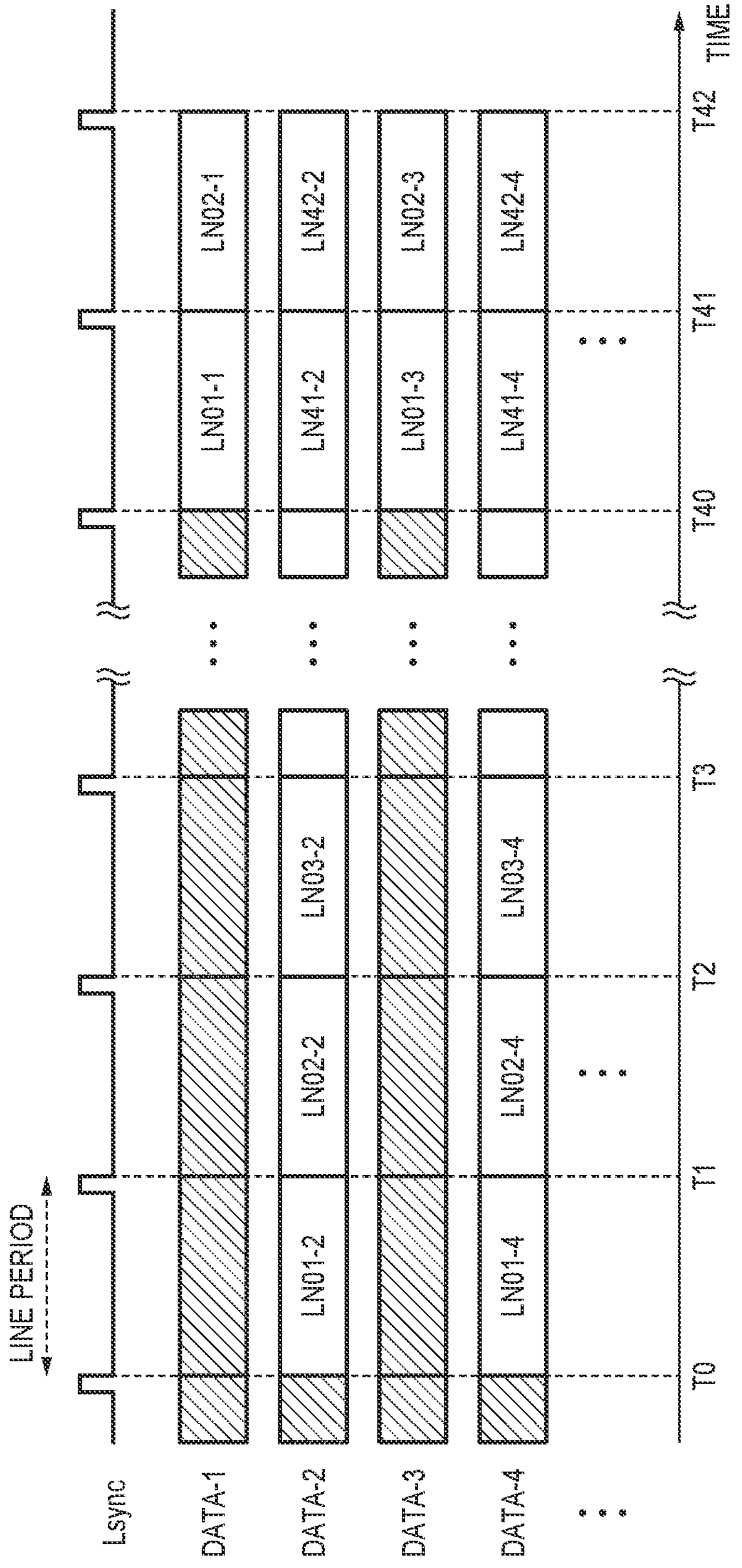
FIG. 12B is a timing chart illustrating another example of output timing for partial image data from the data conversion unit.

FIG. 12B is a timing chart in a format similar to FIG. 12A illustrating a second example of output timing for the partial image data from the data conversion unit 802. The chip arrangement is the odd-numbered-downstream arrangement.

First, in the line period from time T0 to T1, the signal sequence LN01-2 for the light-emitting chip 400-2 and the signal sequence LN01-4 for the light-emitting chip 400-4 of the first line are output. In the next line period from time T1 to T2, the signal sequence LN02-2 for the light-emitting chip 400-2 and the signal sequence LN02-4 for the light-emitting chip 400-4 of the second line are output. During this time, data is not output to the light-emitting chips 400-1 and 400-3 (and the other odd-numbered light-emitting chips 400).

Figure 13B:
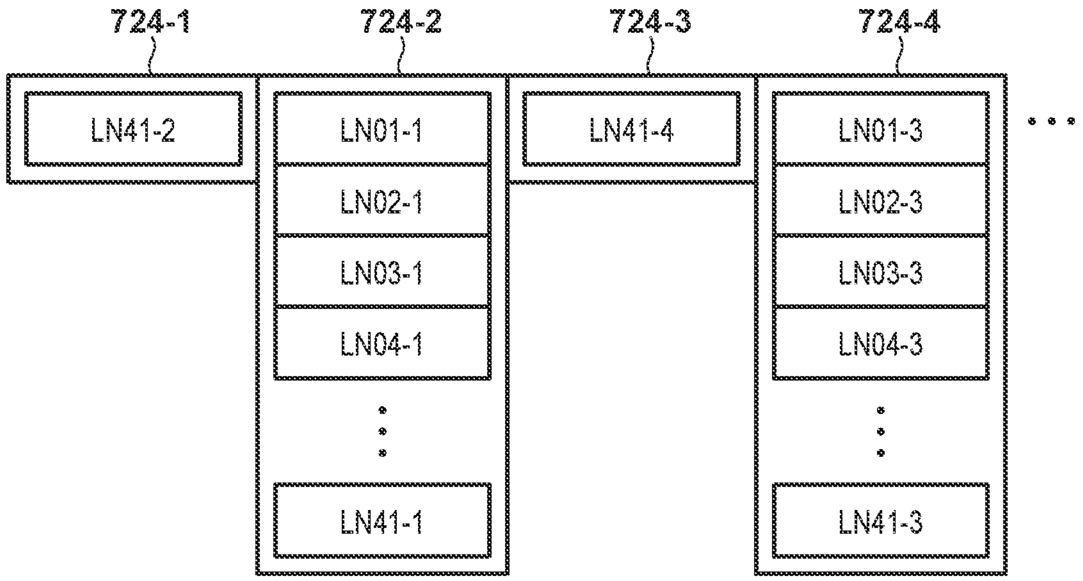
FIG. 13B is a second explanatory diagram illustrating how memory of the data conversion unit stores partial image data.

When time T40 is reached, the signal sequence for 40 lines has been output to the even-numbered light-emitting chips 400-2, 400-4, and so on. The signal sequence LN41-2 for the light-emitting chip 400-2 of the next forty-first line is written to the line memory 724-1. The signal sequence LN41-4 for the light-emitting chip 400-4 of the next forty-first line is written to the line memory 724-3. However, partial image data has not been output to the odd-numbered light-emitting chips 400-1, 400-3, and so on. The line memory 724-2 has the signal sequence for 40 lines for the light-emitting chip 400-1 stored therein, and in addition, the signal sequence LN41-1 of the forty-first line is written. The line memory 724-4 has the signal sequence for 40 lines for the light-emitting chip 400-3 stored therein, and in addition, the signal sequence LN41-3 of the forty-first line is written. FIG. 13B is a diagram illustrating how the data storage unit 723 stores the partial image data at this point in time. In each light-emitting chip 400, since necessary and sufficient amounts of memory resources for timing control of the data output have been allocated as again seen from the diagram, the memory resources are efficiently used without waste.

Returning to FIG. 12B, in the line period from time T40 to T41, the signal sequence LN41-2 for the light-emitting chip 400-2 and the signal sequence LN41-4 for the light-emitting chip 400-4 of the forty-first line are output. Also, in the same line period, the signal sequence LN01-1 for the light-emitting chip 400-1 and the signal sequence LN01-3 for the light-emitting chip 400-3 of the first line are output. In the next line period from time T41 to T42, the signal sequence LN42-2 for the light-emitting chip 400-2 and the signal sequence LN42-4 for the light-emitting chip 400-4 of the forty-second line are output. Also, in the same line period, the signal sequence LN02-1 for the light-emitting chip 400-1 and the signal sequence LN02-3 for the light-emitting chip 400-3 of the second line are output.

(3) Variably Switch Order of Reading Out Pixel Values

In addition to the variable allocation of memory resources based on the chip position information described above, in the present embodiment, the memory control unit 726 also variably switches the order of reading out pixel values from the memory resources.

Specifically, the memory control unit 726 decides whether to read out pixel values constituting the partial image data in the forward direction or the reverse direction when outputting the partial image data from the data conversion unit 802 to each light-emitting chip 400 based on the chip orientation information obtained from the storage unit 810. Take an example in which the chip orientation information indicates the forward direction orientation for a certain light-emitting chip 400. In this example, the memory control unit 726 sets the output selection unit 725 such that the pixel values constituting the partial image data corresponding to the light-emitting chip 400 are read out from the corresponding line memory 724 in the forward direction to output them. Alternatively, take an example in which the chip orientation information indicates the reverse direction orientation for a certain light-emitting chip 400. In this example, the memory control unit 726 sets the output selection unit 725 such that the pixel values constituting the partial image data corresponding to the light-emitting chip 400 are read out from the corresponding line memory 724 in the reverse direction to output them.

Figure 14A:
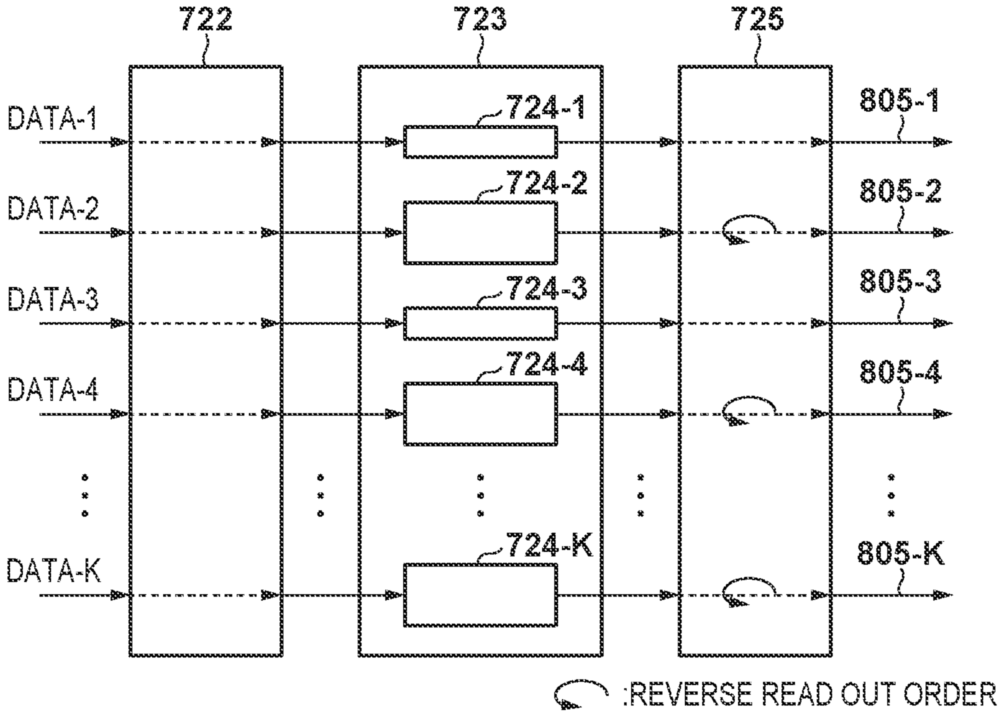
FIG. 14A is a first explanatory diagram for variably switching the order of reading out pixel values.
Figure 14B:
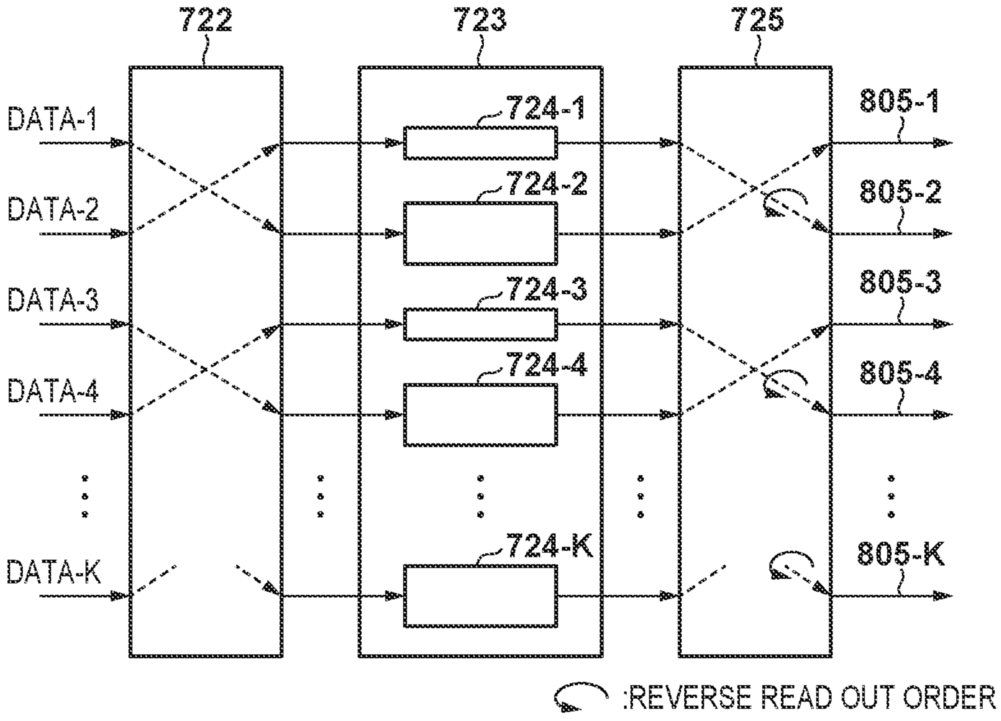
FIG. 14B is a second explanatory diagram for variably switching the order of reading out pixel values.

FIGS. 14A and 14B are explanatory diagrams of the variable switching of the order of reading out pixel values based on the chip orientation information. FIG. 14A, similar to FIG. 11A, illustrates the allocation of memory resources to the light-emitting chips 400 for the even-numbered-downstream arrangement. Herein, it is assumed that the chip orientation information indicates the forward direction orientation for the odd-numbered light-emitting chips 400 and the reverse direction orientation for the even-numbered light-emitting chips 400. In this case, when the partial image data DATA-1 is output, the pixel values are read out from the corresponding line memory 724-1 in the same order as when they are written. This also applies to the partial image data DATA-3 and the partial image data for the other odd-numbered light-emitting chips 400. On the other hand, when the partial image data DATA-2 is output, the pixel values are read out from the corresponding line memory 724-2 in the reverse order as when they are written. This also applies to the partial image data DATA-4 and the partial image data for the other even-numbered light-emitting chips 400. In the diagram, the reversing of the order of reading out is indicated by the curved arrows.

FIG. 14B, similar to FIG. 11B, illustrates the allocation of memory resources to the light-emitting chips 400 for the odd-numbered downstream arrangement. Herein again, the chip orientation information indicates the forward direction orientation for the odd-numbered light-emitting chips 400 and the reverse direction orientation for the even-numbered light-emitting chips 400. In this case, when the partial image data DATA-1 is output, the pixel values are read out from the corresponding line memory 724-2 in the same order as when they are written. This also applies to the partial image data DATA-3 and the partial image data for the other odd-numbered light-emitting chips 400. On the other hand, when the partial image data DATA-2 is output, the pixel values are read out from the corresponding line memory 724-1 in the reverse order as when they are written. This also applies to the partial image data DATA-4 and the partial image data for the other even-numbered light-emitting chips 400.

Figure 15:
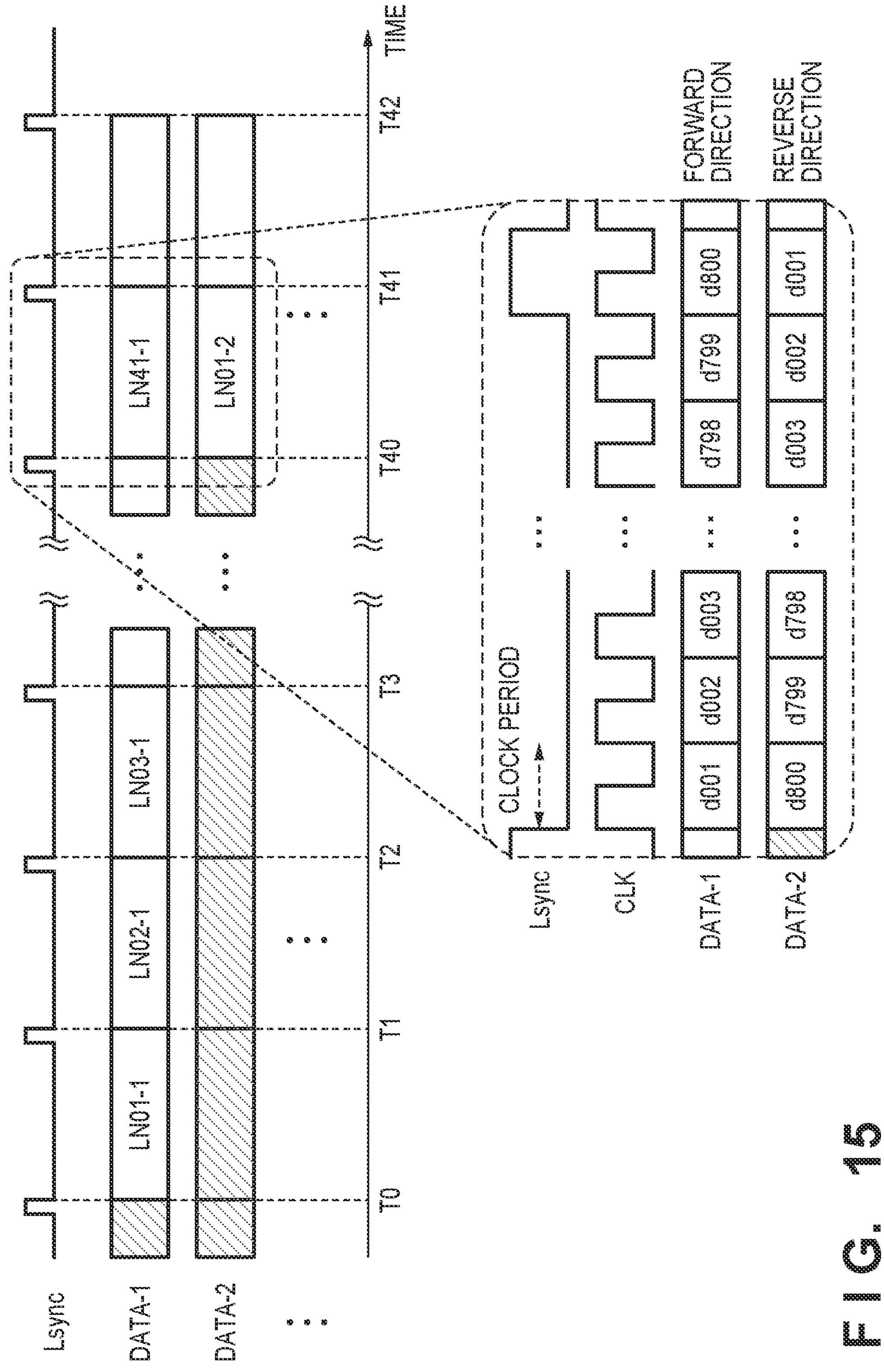
FIG. 15 is a timing chart illustrating an example of the reversing of the order of reading out the pixel values.

FIG. 15 is a timing chart illustrating an example of the reversing of the order of reading out pixel values. Herein, an even-numbered-downstream arrangement similar to that used in the example in FIG. 12A is employed. In the lower half of FIG. 15, the signal sequence LN41-1 for the light-emitting chip 400-1 and the signal sequence LN01-2 for the light-emitting chip 400-2 output in the line period from time T40 to T41 are indicated in an enlarged manner. The timing of the rise and the fall of the clock signal CLK indicating the clock period is also illustrated, and each signal sequence includes one pixel value dxxx for each clock period, where xxx is an index that is incremented in the scanning order of pixel values in each piece of partial image data. As an example, each piece of partial image data includes 800 pixel values.

In the example in FIG. 15, the chip orientation information indicates the forward direction orientation for the odd-numbered light-emitting chips 400 and the reverse direction orientation for the even-numbered light-emitting chips 400. Accordingly, the signal sequence LN41-1 for the light-emitting chip 400-1 includes the pixel values d001 to d800 arranged in a time series in ascending order of the index that are read out in the forward direction from the line memory 724-1. On the other hand, the signal sequence LN01-2 for the light-emitting chip 400-2 includes the pixel values d800 to d001 arranged in a time series in descending order of the index that are read out in the reverse direction from the line memory 724-2. By outputting the pixel values read out from the memory in the reverse order in this manner for the light-emitting chips 400 arranged in the reverse direction orientation, the photosensitive body 102 can be exposed with light such that the images of each line are appropriately represented.

(4) Modified Examples

In a modified example of the embodiment described above, each line memory 724 of the data storage unit 723 may include additional capacity that can be used for compensating for the effects of implementation misalignment of each light-emitting chip 400 along the second direction D2. In addition, the chip arrangement information written to the storage unit 810 of the printed substrate 202 may include third control information indicating the degree of implementation misalignment of each light-emitting chip 400 measured in the test phase after manufacture. The degree of implementation misalignment, for example, may be represented by an integer value indicating how many times the line period the output timing of the partial image data to each light-emitting chip 400 should be additionally delayed.

Figure 16:
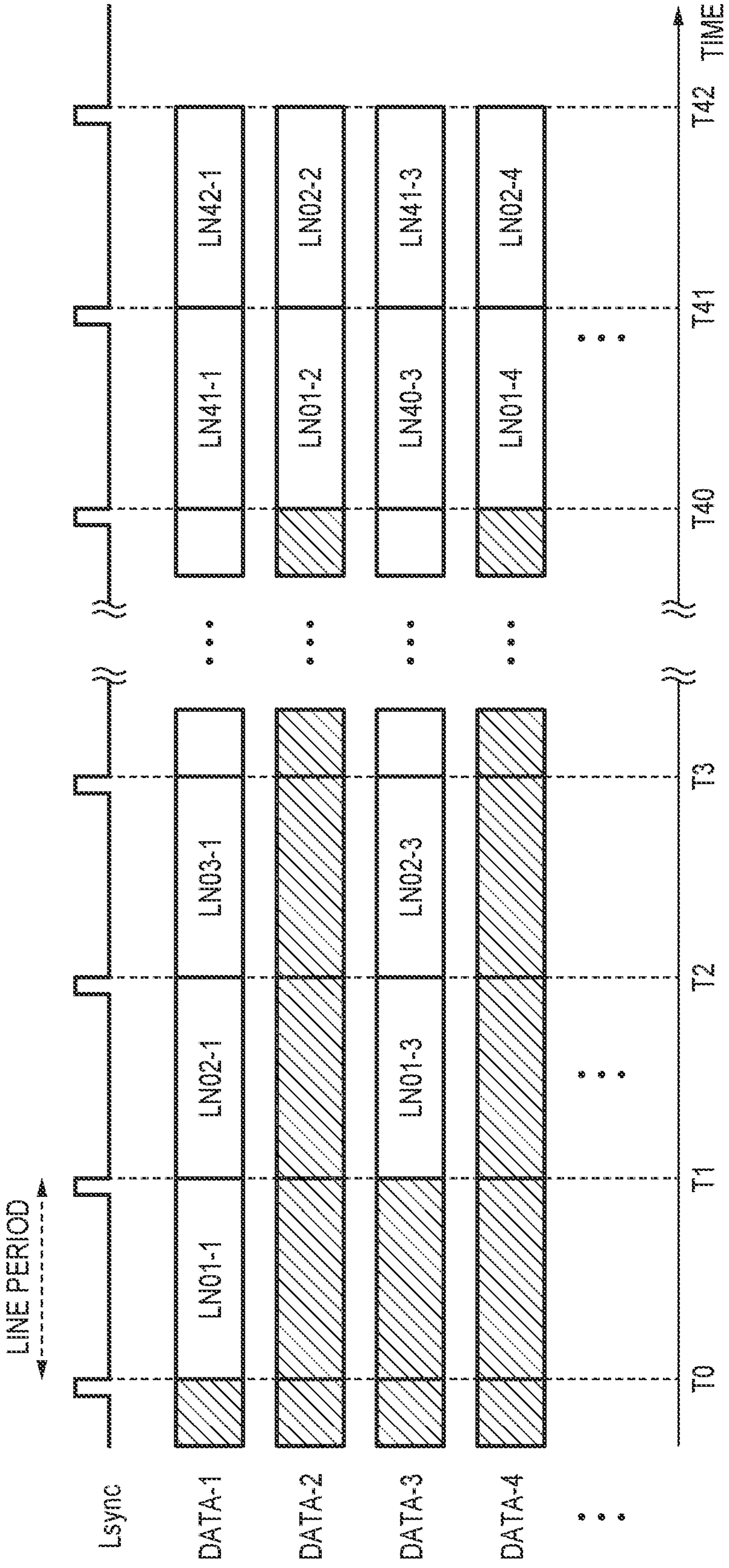
FIG. 16 is a timing chart illustrating an example of output timing for partial image data from the data conversion unit according to a modified example.

FIG. 16 is a timing chart illustrating an example of output timings of partial image data from the data conversion unit 802 according to such a modified example. Herein, the chip arrangement is the even-numbered-downstream arrangement. The third control information obtained from the storage unit 810 indicates that the light-emitting chip 400-3 has been misaligned by an amount equal to one line period to the downstream side.

First, in the line period from time T0 to T1, the signal sequence LN01-1 for the light-emitting chip 400-1 of the first line is output. At this time, the signal sequence LN01-3 for the light-emitting chip 400-3 of the first line is not output. In the next line period from time T1 to T2, the signal sequence LN02-1 for the light-emitting chip 400-1 of the second line and the signal sequence LN01-3 for the light-emitting chip 400-3 of the first line are output. On the other hand, the signal sequences for the light-emitting chips 400-2 and 400-4 are not output until time T40 is reached in accordance with the chip position information.

According to this modified example, the effects of implementation misalignment of each light-emitting chip 400 along the second direction D2, which is the rotation direction of the photosensitive body 102, is compensated for by delay control of output timings of respective pieces of data, so that a decrease in image quality due to implementation misalignment can be avoided.

6. PROCESSING FLOW

Figure 17:
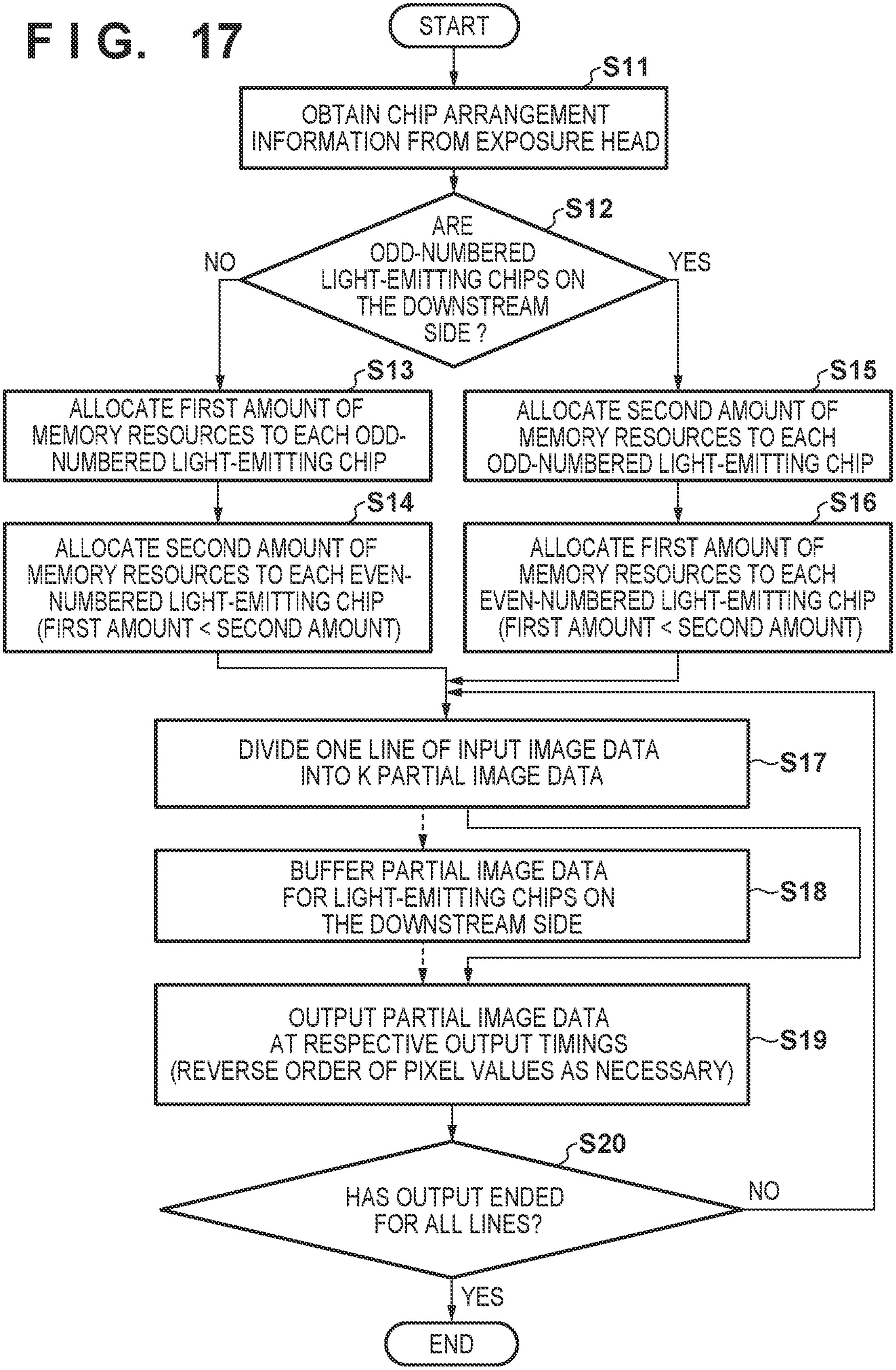
FIG. 17 is a flowchart illustrating an example of a flow of exposure control processing according to an embodiment.

FIG. 17 is a flowchart illustrating an example of a flow of the exposure control processing that can be executed in the present embodiment. The exposure control processing in FIG. 17 can be executed by the data conversion unit 802 of the image controller 800. Note that herein, processing step is abbreviated to “S”.

First, in S11, the memory control unit 726 of the data conversion unit 802 obtains the chip arrangement information read out by the CPU 811 from the storage unit 810 of the exposure head 106 connected to the image controller 800. The chip arrangement information includes the chip position information and the chip orientation information.

Next, in S12, the memory control unit 726 determines if the odd-numbered light-emitting chips, from among the plurality of light-emitting chips 400 arranged in a staggered manner in the exposure head 106, are positioned on the downstream side based on the chip position information. When the odd-numbered light-emitting chips are on the upstream side, the processing proceeds to S13. When the odd-numbered light-emitting chips are on the downstream side, the processing proceeds to S15.

In S13, the memory control unit 726 allocates a first amount of memory resources of the data storage unit 723 to each odd-numbered light-emitting chip 400 located on the upstream side. Next, in S14, the memory control unit 726 allocates a second amount of memory resources of the data storage unit 723 to each even-numbered light-emitting chip 400 located on the downstream side. In this example, the second amount is larger than the first amount.

In S15, the memory control unit 726 allocates the second amount of memory resources of the data storage unit 723 to each odd-numbered light-emitting chip 400 located on the downstream side. Next, in S16, the memory control unit 726 allocates the first amount of memory resources of the data storage unit 723 to each even-numbered light-emitting chip 400 located on the upstream side. In this example as well, the second amount is larger than the first amount.

Thereafter, in S17, the processing on the input image data is started, and the data dividing unit 721 divides one line of the input image data into K pieces of partial image data. The data dividing unit 721 writes the K pieces of partial image data to the corresponding line memories 724 of the data storage unit 723 via the input selection unit 722 in accordance with the memory resource allocation by the memory control unit 726. In S18, the data storage unit 723 buffers the partial image data for the light-emitting chips on the downstream side. Buffering of the partial image data may be continued for an interval corresponding to the chip gap L2. For the partial image data for the light-emitting chips on the upstream side, the buffering in S18 may not be performed. In S19, the output selection unit 725, under control by the memory control unit 726, reads out pieces of the partial image data at respective output timings from the corresponding line memory 724 and outputs them to the corresponding light-emitting chips 400. At this time, the output selection unit 725 reverses the order of reading out pixel values from the line memory 724 as necessary based on the chip orientation information.

Thereafter, in S20, the memory control unit 726 determines whether output for all of the lines of the input image data has ended. In a case where there remains a line that has not been output, the processing returns to S17, and S17 to S19 are repeated for the next line. In a case where there remains no line that has not been output, the exposure control processing in FIG. 17 ends.

7. CONCLUSION

Various embodiments have been described in detail using FIGS. 1 to 17. According to the embodiments described above, the exposure control apparatus controls the exposure of the photosensitive body by the exposure head including the K light-emitting chips arranged in a staggered manner along a direction parallel to the rotation axis of the photosensitive body. The exposure control apparatus includes a set of memory resources that temporarily store K pieces of partial image data constituting the image data of each line of an input image. Then, the exposure control apparatus described above controls memory resource allocation to the K light-emitting chips based on the first control information indicating whether the odd-numbered light-emitting chips or the even-numbered light-emitting chips are arranged on the downstream side. Variably allocating memory resources in this manner can remove the need to associate memory resources with a large uniform capacity to all of the light-emitting chips and can suppress an increase in the manufacturing costs of the apparatus. At the same time, the manufacturer will be allowed to provide any one of the odd-numbered light-emitting chips and the even-numbered light-emitting chips on the downstream side in a staggered arrangement. Thus, flexibility in the arrangement of the light-emitting chips in the exposure head is ensured. This contributes to enhancement of reusability of components among products of different types and makes it easier for the manufacturer of image-forming apparatuses to cater to various needs of the market.

In the embodiments described above, based on the first control information, the first amount of memory resources is allocated to each light-emitting chip determined to be arranged on the upstream side and the second amount, larger than the first amount, of memory resources is allocated to each light-emitting chip determined to be arranged on the downstream side. Accordingly, appropriate delay control of output timings of the partial image data can be performed, and the required amount of memory resources for the delay control can be reduced.

In the embodiments described above, the difference between the first amount of memory resources allocated to the light-emitting chips on the upstream side and the second amount of memory resources allocated to the light-emitting chips on the downstream side is based on the number of line periods that advance between points in time of outputting data to the light-emitting chips. By deciding the amount of memory resources to be allocated in this manner, the memory resources allocated to each light-emitting chip are utilized to the maximum, and waste in memory resources is removed.

In the embodiments described above, the exposure control apparatus obtains the control information which has been written in the storage unit of the exposure head by an external apparatus. Accordingly, as long as the appropriate control information has been written in the storage unit of the exposure head, the exposure control apparatus can perform exposure control suitable for the chip arrangement employed in that exposure head.

In the embodiments described above, the exposure control apparatus may control the order of reading out pixel values constituting the partial image data when outputting the partial image data from the memory resources based on the second control information indicating the implemented orientation of each of the K light-emitting chips. By controlling the order of reading out pixel values in this manner, it will be possible to arrange light-emitting chips of the same type in any orientation in the exposure head, allowing the reusability of components to be further enhanced.

In the embodiments described above, specific numerical values have been used for description, but these specific numerical values are examples. The disclosure is not limited to the specific numerical values used in the embodiments. For example, the number of light-emitting elements arranged in the first direction in one light-emitting chip is not limited to 800, and any number equal to or larger than one can be used. Also, the pitch of the light-emitting elements is not limited to 21.16 μm, and any other value can be used. Also, the chip gap is not limited to approximately 846.4 μm, and any other value can be used.

8. OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2022-177362, filed on Nov. 4, 2022, which is hereby incorporated by reference herein in its entirety.

What is claimed is:

1. An apparatus for controlling exposure of a photosensitive body with light by an exposure head, wherein the exposure head includes K (K is an integer equal to or larger than two) light-emitting chips that are arranged in a staggered manner along a first direction that is parallel to a rotation axis of the photosensitive body, each of the K light-emitting chips includes at least a plurality of light-emitting elements arranged along the first direction, the plurality of light-emitting elements of the K light-emitting chips emit light whereby a latent image for each line of an input image is formed on a surface of the photosensitive body, the apparatus comprising:

a dividing unit configured to divide image data of each line of the input image into K pieces of partial image data that are respectively output to the K light-emitting chips;

a first storage unit that is a set of memory resources for temporarily storing the K pieces of partial image data; and a control unit configured to control output of the K pieces of partial image data from the first storage unit to the K light-emitting chips, wherein the control unit is configured to control allocation of the memory resources to the K light-emitting chips based on first information indicating which one of an odd-numbered group including odd-numbered light-emitting chips out of the K light-emitting chips and an even-numbered group including even-numbered light-emitting chips out of the K light-emitting chips is arranged on downstream side with respect to a rotation direction of the photosensitive body, and wherein the control unit is configured to, based on the first information:

allocate a first amount of memory resources to each of light-emitting chips determined to be arranged on upstream side; and allocate a second amount of memory resources to each of light-emitting chips determined to be arranged on downstream side, the second amount being larger than the first amount.

2. The apparatus according to claim 1, wherein the control unit is configured to:

cause partial image data for the light-emitting chips on upstream side to be output from the first storage unit to the light-emitting chips on upstream side at a first point in time; and cause partial image data for the light-emitting chips on downstream side to be output from the first storage unit to the light-emitting chips on downstream side at a second point in time, the second point in time being later than the first point in time.

3. The apparatus according to claim 2, wherein a difference between the first amount of memory resources allocated to the light-emitting chips on upstream side and the second amount of memory resources allocated to the light-emitting chips on downstream side is based on number of line periods that advance during an interval from the first point in time to the second point in time.

4. The apparatus according to claim 3, wherein the interval from the first point in time to the second point in time is based on a gap between the light-emitting chips on upstream side and the light-emitting chips on downstream side in the rotation direction of the photosensitive body, and a peripheral speed of the photosensitive body.

5. The apparatus according to claim 1, wherein the exposure head includes a second storage unit having stored therein the first information written by an external apparatus, and wherein the control unit is configured to obtain the first information read out from the second storage unit.

6. The apparatus according to claim 1, wherein the control unit is configured to control, based on second information indicating an orientation in which each of the K light-emitting chips is implemented in the exposure head, an order of reading out pixel values constituting corresponding partial image data when outputting the partial image data from the first storage unit to each light-emitting chip.

7. The apparatus according to claim 6, wherein the control unit is configured to:

in a case where the orientation indicated by the second information for a light-emitting chip is a first orientation, read out pixel values constituting partial image data corresponding to that light-emitting chip from the first storage unit in forward direction to output the pixel values to that light-emitting chip; and in a case where the orientation indicated by the second information for a light-emitting chip is a second orientation, read out pixel values constituting partial image data corresponding to that light-emitting chip from the first storage unit in reverse direction to output the pixel values to that light-emitting chip.

8. The apparatus according to claim 1, wherein the first storage unit is constituted by a static random access memory (SRAM).

9. An image-forming apparatus comprising:

the photosensitive body;

the exposure head; and the apparatus according to claim 1 that is connected to the exposure head.

10. The image-forming apparatus according to claim 9, wherein the control unit is configured to:

cause partial image data for the light-emitting chips on upstream side to be output from the first storage unit to the light-emitting chips on upstream side at a first point in time; and cause partial image data for the light-emitting chips on downstream side to be output from the first storage unit to the light-emitting chips on downstream side at a second point in time, the second point in time being later than the first point in time.

11. The image-forming apparatus according to claim 10, wherein a difference between the first amount of memory resources allocated to the light-emitting chips on upstream side and the second amount of memory resources allocated to the light-emitting chips on downstream side is based on number of line periods that advance during an interval from the first point in time to the second point in time.

12. The image-forming apparatus according to claim 11, wherein the interval from the first point in time to the second point in time is based on a gap between the light-emitting chips on upstream side and the light-emitting chips on downstream side in the rotation direction of the photosensitive body, and a peripheral speed of the photosensitive body.

13. The image-forming apparatus according to claim 9, wherein the exposure head includes a second storage unit having stored therein the first information written by an external apparatus, and wherein the control unit is configured to obtain the first information read out from the second storage unit.

14. The image-forming apparatus according to claim 9, wherein the control unit is configured to control, based on second information indicating an orientation in which each of the K light-emitting chips is implemented in the exposure head, an order of reading out pixel values constituting corresponding partial image data when outputting the partial image data from the first storage unit to each light-emitting chip.

15. The image-forming apparatus according to claim 14, wherein the control unit is configured to:

in a case where the orientation indicated by the second information for a light-emitting chip is a first orientation, read out pixel values constituting partial image data corresponding to that light-emitting chip from the first storage unit in forward direction to output the pixel values to that light-emitting chip; and in a case where the orientation indicated by the second information for a light-emitting chip is a second orientation, read out pixel values constituting partial image data corresponding to that light-emitting chip from the first storage unit in reverse direction to output the pixel values to that light-emitting chip.

16. The image-forming apparatus according to claim 9, wherein the first storage unit is constituted by a static random access memory (SRAM).

* * * * *